US010142202B2

(12) United States Patent
Sundararajan et al.

(10) Patent No.: US 10,142,202 B2
(45) Date of Patent: Nov. 27, 2018

(54) DETERMINATION OF END-TO-END TRANSPORT QUALITY

(71) Applicant: QUALCOMM Incorporated, San Diego, CA (US)

(72) Inventors: Jay Kumar Sundararajan, San Diego, CA (US); Arnaud Meylan, San Diego, CA (US); Song Wang, Irvine, CA (US); David William Craig, San Diego, CA (US); Manu Sharma, San Diego, CA (US); Niranjan Ramesh Pendharkar, San Diego, CA (US); Rajat Prakash, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/327,388

(22) Filed: Jul. 9, 2014

(65) Prior Publication Data

US 2015/0215184 A1 Jul. 30, 2015

Related U.S. Application Data

(60) Provisional application No. 61/933,799, filed on Jan. 30, 2014.

(51) Int. Cl.
*H04L 12/26* (2006.01)

(52) U.S. Cl.
CPC .......... *H04L 43/0811* (2013.01); *H04L 43/00* (2013.01); *H04L 43/0864* (2013.01); *H04L 43/16* (2013.01)

(58) Field of Classification Search
CPC .............................. H04L 43/0811; H04L 43/00
(Continued)

(56) References Cited

U.S. PATENT DOCUMENTS 5,615,214 A * 3/1997 Chandos ............. H04L 12/6418
370/349
7,012,900 B1 * 3/2006 Riddle ................ H04L 41/5032
370/252
(Continued)

FOREIGN PATENT DOCUMENTS

WO WO-2008014421 A2 1/2008
WO WO-2013137709 A1 9/2013

OTHER PUBLICATIONS

ISA/EPO, International Search Report and Written Opinion of the International Searching Authority, Int'l. App. No. PCT/US2015/011907, dated Apr. 30, 2015, European Patent Office, Rijswijk, NL, 11 pgs.
(Continued)

*Primary Examiner* — Mang Yeung
*Assistant Examiner* — Peter G Solinsky
(74) *Attorney, Agent, or Firm* — Holland & Hart LLP

(57) ABSTRACT

Methods, systems, and devices are described for assessing the quality of end-to-end connectivity for a wireless communication device. Data generated from at least one of existing traffic and networking operations caused by existing traffic of the wireless communication device may be monitored to obtain information related to connectivity quality. One or more values of one or more metrics may be determined using the obtained information. The quality of end-to-end connectivity for the wireless communication device may be assessed using the value(s) of the metric(s). Based at least in part on a result of the assessment, an action may be performed to improve connectivity quality for the wireless communication.

26 Claims, 18 Drawing Sheets

(58) Field of Classification Search
USPC .......................................................... 370/252
See application file for complete search history.

(56) References Cited

U.S. PATENT DOCUMENTS

| | | | |
|---|---|---|---|
| 8,954,670 B1* | 2/2015 | Subramanian | G06F 11/1092 711/113 |
| 9,055,514 B2 | 6/2015 | Meylan et al. | |
| 2001/0039585 A1* | 11/2001 | Primak | H04L 29/12066 709/228 |
| 2003/0028643 A1* | 2/2003 | Jabri | H04L 65/1043 709/226 |
| 2003/0117972 A1* | 6/2003 | Vimpari | H04L 1/0007 370/328 |
| 2004/0120306 A1* | 6/2004 | Wigard | H04L 1/16 370/349 |
| 2006/0034185 A1* | 2/2006 | Patzschke | H04L 41/046 370/252 |
| 2008/0013558 A1* | 1/2008 | Ito | H04W 36/08 370/404 |
| 2008/0181116 A1* | 7/2008 | Kavanaugh | H04L 67/322 370/236 |
| 2009/0086672 A1* | 4/2009 | Gholmieh | H04W 48/14 370/329 |
| 2010/0125661 A1* | 5/2010 | Perala | G06F 15/173 709/224 |
| 2010/0208603 A1* | 8/2010 | Ishii | H04B 1/7113 370/252 |
| 2010/0315951 A1* | 12/2010 | Bugenhagen | H04L 41/14 370/241 |
| 2011/0201285 A1 | 8/2011 | Giaretta et al. | |
| 2011/0286469 A1* | 11/2011 | Yasuda | H04L 1/188 370/412 |
| 2012/0307621 A1* | 12/2012 | Zawaideh | H04W 76/028 370/216 |
| 2012/0309397 A1* | 12/2012 | Rao | H04W 8/00 455/437 |
| 2013/0036468 A1* | 2/2013 | Georgiev | H04L 61/1511 726/23 |
| 2013/0060887 A1* | 3/2013 | Bradnick | H04L 1/1642 709/217 |
| 2013/0129350 A1 | 5/2013 | Koley et al. | |
| 2013/0155888 A1 | 6/2013 | Awais | |
| 2013/0198269 A1* | 8/2013 | Fleischman | H04L 61/20 709/203 |
| 2013/0246575 A1 | 9/2013 | Giaretta | |
| 2013/0247041 A1 | 9/2013 | Heninger et al. | |
| 2013/0250779 A1 | 9/2013 | Meloche et al. | |
| 2013/0250780 A1 | 9/2013 | Meylan et al. | |
| 2013/0250786 A1 | 9/2013 | Balasaygun et al. | |
| 2014/0022997 A1* | 1/2014 | Xue | H04W 24/10 370/328 |
| 2014/0237107 A1* | 8/2014 | Ince | H04L 69/40 709/224 |
| 2014/0269380 A1* | 9/2014 | Rusak | H04L 43/0811 370/252 |
| 2014/0328205 A1* | 11/2014 | Schrecke | H04L 43/0894 370/253 |

OTHER PUBLICATIONS

IPEA/EPO, Second Written Opinion of the International Preliminary Examining Authority, Int'l. App. No. PCT/US2015/011907, dated Dec. 18, 2015, European Patent Office, Munich, DE, 7 pgs.
Taiwan Search Report—TW103145281—TIPO—dated May 19, 2018.

* cited by examiner

DETERMINATION OF END-TO-END TRANSPORT QUALITY

CROSS REFERENCES

The present Application for Patent claims priority to U.S. Provisional Patent Application No. 61/933,799 by Sundararajan et al., entitled "Determination of End-to-End Transport Quality," filed Jan. 30, 2014, assigned to the assignee hereof.

FIELD OF THE DISCLOSURE

The present disclosure relates generally to wireless communication, and more specifically to determining end-to-end transport quality for a wireless communication device.

DESCRIPTION OF RELATED ART

Wireless communications systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems.

Generally, a wireless multiple-access communications system may include a number of base stations, each simultaneously supporting communication for multiple mobile devices. Base stations may communicate with mobile devices on downstream and upstream links. Each base station has a coverage range, which may be referred to as the coverage area of the cell. A base station may broadcast within the cell certain multimedia content in data streams that may be accessed on cellular-enabled mobile devices. Within the cell there may be certain mobile devices that are not cellular-enabled, but may still be enabled to communicate wirelessly with a wireless router (e.g., wireless local area network (WLAN) wireless router) or with a data card (e.g., a device capable of sending and/or receiving data over a cellular network) through a universal serial bus (USB) connection.

The quality of such wireless connections may vary. However, current systems for determining or assessing quality are limited in several ways. Current systems tend to only assess components of the connection. For example, in some instances, only the quality of the air link is assessed (e.g., signal strength and/or congestion). In some cases, components may be assessed only at the time of connection to the network. In cases where the entire end-to-end connection is actually assessed, the assessment requires active testing, such as generating messages requesting information from the network or generating traffic solely for the sake of testing transport quality.

SUMMARY

The described features generally relate to one or more improved systems, methods, and/or apparatuses for determining or assessing end-to-end transport/connectivity quality for a wireless communication device. A wireless communication device may use data generated by existing traffic to assess the quality of end-to-end connectivity. Such data may be indicators of or otherwise be related to connectivity quality. In some examples, the data may be at the transport layer or above.

In a first set of illustrative examples, a method for assessing a quality of end-to-end connectivity for a wireless communication device is described. In one example, the method may include monitoring data generated from existing traffic of the wireless communication device; determining a formation of a gap in at least one data stream of the existing traffic by computing a statistic comprising a difference between a time of a most recent in-order arrival and a time of a most recent arrival; determining at least one value of at least one metric, the at least one metric based at least in part on the formation of the gap; and assessing the quality of end-to-end connectivity for the wireless communication device based at least in part on the at least one value of the at least one metric.

In some examples, the method of the first set of illustrative examples may include selecting the at least one data stream for use in determining the formation of the gap based at least in part on activity of the existing traffic in at least one of an uplink (UL) direction, a downlink (DL) direction, or a combination thereof. In some examples, the activity of the existing traffic in the uplink (UL) direction is based on a time since last transmission, and the activity of the existing traffic in the downlink (DL) direction is based on a time since last reception. In some examples, the at least one data stream belongs to a transmission control protocol (TCP) connection. In some examples, the at least one data stream belongs to a real-time transport protocol (RTP) connection.

In some examples, the determining the formation of the gap in the at least one data stream may include detecting the sending of duplicate acknowledgements (ACKs) in the at least one data stream. In some examples, the determining the formation of the gap in the at least one data stream may include computing a statistic comprising a difference between a time of a most recent in-order arrival and a time of a most recent arrival. In some examples, the assessing the quality of end-to-end connectivity may include determining whether the computed statistic exceeds a threshold value; and determining that the quality of end-to-end connectivity needs to be improved if the computed statistic exceeds the threshold value.

In some examples, the method of the first set of illustrative examples may include performing an action to improve connectivity quality for the wireless communication device based at least in part on a result of the assessing. In some examples, the performing the action may include switching to one of a different access interface and a different access point on a same interface. In some examples, the performing the action may include blacklisting an access point currently being used by the wireless communication device. In some examples, the monitoring may include monitoring data generated from existing traffic between the wireless communication device and the Internet.

In some examples, the method of the first set of illustrative examples may include determining a transport quality estimate (TQE) value using the at least one value of the at least one metric, the assessing of the quality of end-to-end connectivity for the wireless communication device being based at least in part on the TQE value. In some examples, the assessing comprises determining the transport quality estimate (TQE) value to be one of good and fail. In some examples, the method of the first set of illustrative examples may include identifying that interface-level throughput exceeds a threshold, wherein the TQE value is constrained to be good based at least in part on the identifying.

In some examples, the method of the first set of illustrative examples may include configuring at least one operational parameter for at least one of the monitoring data, the determining the at least one value, and the assessing the quality, the at least one operational parameter based at least in part on an access interface being used for the existing traffic, an alternative interface available for use, or a combination thereof. In some examples, the quality of end-to-end connectivity comprises at least one of a quality of airlink connectivity, a quality of backhaul connectivity, or a combination thereof.

In a second set of illustrative examples, a method for assessing a quality of end-to-end connectivity for a wireless communication device is described. In one example, the method may include monitoring data generated from networking operations caused by existing traffic of the wireless communication device to obtain information related to connectivity quality; determining at least one value of at least one metric based at least in part on the obtained information, the obtained information comprising at least one of a success event, an error event, or a combination thereof, occurring in the wireless communication device; and assessing the quality of end-to-end connectivity for the wireless communication device based at least in part on the at least one value of the at least one metric.

In some examples, the error event comprises at least one domain name system (DNS) error code. In some examples, the method of the second set of illustrative examples may include monitoring at least one subsequent DNS query attempt; and identifying at least one subsequent error event occurring from the at least one subsequent DNS query attempt. In some examples, the monitoring may include monitoring at least one of log messages and return codes generated from networking operations caused by existing traffic of the wireless communication device. In some examples, the error event may include at least one error event in an application layer of the wireless communication device.

In some examples, the method of the second set of illustrative examples may include performing an action to improve connectivity quality for the wireless communication device based at least in part on a result of the assessing. In some examples, the performing the action may include switching to one of a different access interface and a different access point on a same interface. In some examples, the performing the action may include blacklisting an access point currently being used by the wireless communication device. In some examples, the monitoring may include monitoring data generated from existing traffic between the wireless communication device and the Internet. In some examples, the quality of end-to-end connectivity comprises at least one of a quality of airlink connectivity, a quality of backhaul connectivity, or a combination thereof.

In a third set of illustrative examples, a method for assessing a quality of end-to-end connectivity for a wireless communication device is described. In one example, the method may include monitoring data generated from existing traffic of the wireless communication device to obtain information related to connectivity quality; determining at least one value of at least one metric based at least in part on the obtained information, the obtained information comprising at least one round trip time (RTT); determining a statistic of the at least one metric; and assessing the quality of end-to-end connectivity for the wireless communication device based at least in part on the determined statistic of the at least one metric.

In some examples, the at least one RTT is obtained from at least one domain name system (DNS) query response time. In some examples, the monitoring may include analyzing at least one TCP condition to obtain the at least one RTT. In some examples, determining the statistic of the at least one metric may include determining the statistic from response times of multiple DNS queries, multiple samples of RTT, or a combination thereof.

In some examples, the assessing of the quality of end-to-end connectivity may include determining whether the determined statistic exceeds a threshold value; and determining that the quality of end-to-end connectivity needs to be improved if the determined statistic exceeds a threshold value. In some examples, the determining of the statistic of the at least one metric may include computing the statistic of the at least one metric. In some examples, the assessing of the quality of end-to-end connectivity may include determining whether the computed statistic exceeds a threshold value; and determining that the quality of end-to-end connectivity needs to be improved if the computed statistic exceeds a threshold value.

In some examples, the method of the third set of illustrative examples may include performing an action to improve connectivity quality for the wireless communication device based at least in part on a result of the assessing. In some examples, the performing the action may include switching to one of a different access interface and a different access point on a same interface. In some examples, the performing the action may include blacklisting an access point currently being used by the wireless communication device. In some examples, the obtained information comprises a statistic of RTTs; and the determining of the statistic of the at least one metric comprises obtaining the information. In some examples, the monitoring may include monitoring data generated from existing traffic between the wireless communication device and the Internet.

In some examples, the method of the third set of illustrative examples may include determining a transport quality estimate (TQE) value using the at least one value of the at least one metric, the assessing of the quality of end-to-end connectivity for the wireless communication device being based at least in part on the TQE value. In some examples, the assessing may include determining the transport quality estimate (TQE) value to be one of good and fail. In some examples, the method may include identifying that interface-level throughput exceeds a threshold, wherein the TQE value is constrained to be good based at least in part on the identifying.

In some examples, the method of the third set of illustrative examples may include configuring at least one operational parameter for at least one of the monitoring data, the determining the at least one value, and the assessing the quality, the at least one operational parameter based at least in part on an access interface being used for the existing traffic, an alternative interface available for use, or a combination thereof. In some examples, the quality of end-to-end connectivity comprises at least one of a quality of airlink connectivity, a quality of backhaul connectivity, or a combination thereof.

In a fourth set of illustrative examples, a device to assess the quality of end-to-end connectivity for a wireless communication device is described. In one example, the device may include a processor, a memory in electronic communication with the processor, and instructions stored in the memory. The instructions may be executable by the processor to monitor data generated from existing traffic of the wireless communication device; determine a formation of a gap in at least one data stream of the existing traffic by computing a statistic comprising a difference between a time of a most recent in-order arrival and a time of a most recent arrival; determine at least one value of at least one metric, the at least one metric based at least in part on the formation of the gap; and assess the quality of end-to-end connectivity for the wireless communication device based at least in part on the at least one value of the at least one metric. In some examples, the instructions may also be executable by the processor to implement one or more aspects of the method for wireless communication described above with respect to the first set of illustrative examples.

In a fifth set of illustrative examples, a device to assess the quality of end-to-end connectivity for a wireless communication device is described. In one example, the device may include a processor, a memory in electronic communication with the processor, and instructions stored in the memory. The instructions may be executable by the processor to monitor data generated from networking operations caused by existing traffic of the wireless communication device to obtain information related to connectivity quality; determine at least one value of at least one metric based at least in part on the obtained information, the obtained information comprising at least one of a success event, an error event, or a combination thereof, occurring in the wireless communication device; and assess the quality of end-to-end connectivity for the wireless communication device based at least in part on the at least one value of the at least one metric. In some examples, the instructions may also be executable by the processor to implement one or more aspects of the method for wireless communication described above with respect to the second set of illustrative examples.

In a sixth set of illustrative examples, a device to assess the quality of end-to-end connectivity for a wireless communication device is described. In one example, the device may include a processor, a memory in electronic communication with the processor, and instructions stored in the memory. The instructions may be executable by the processor to monitor data generated from existing traffic of the wireless communication device to obtain information related to connectivity quality; determine at least one value of at least one metric based at least in part on the obtained information, the obtained information comprising at least one round trip time (RTT); determine a statistic of the at least one metric; and assess the quality of end-to-end connectivity for the wireless communication device based at least in part on the determined statistic of the at least one metric. In some examples, the instructions may also be executable by the processor to implement one or more aspects of the method for wireless communication described above with respect to the third set of illustrative examples.

In a seventh set of illustrative examples, an apparatus for assessing the quality of end-to-end connectivity for a wireless communication device is described. In one example, the apparatus may include means for monitoring data generated from existing traffic of the wireless communication device; means for determining a formation of a gap in at least one data stream of the existing traffic by computing a statistic comprising a difference between a time of a most recent in-order arrival and a time of a most recent arrival; means for determining at least one value of at least one metric, the at least one metric based at least in part on the formation of the gap; and means for assessing the quality of end-to-end connectivity for the wireless communication device based at least in part on the at least one value of the at least one metric. In some examples, the apparatus may also include means for implementing one or more aspects of the method for wireless communication described above with respect to the first set of illustrative examples.

In an eighth set of illustrative examples, an apparatus for assessing the quality of end-to-end connectivity for a wireless communication device is described. In one example, the apparatus may include means for monitoring data generated from networking operations caused by existing traffic of the wireless communication device to obtain information related to connectivity quality; means for determining at least one value of at least one metric based at least in part on the obtained information, the obtained information comprising at least one of a success event, an error event, or a combination thereof, occurring in the wireless communication device; and means for assessing the quality of end-to-end connectivity for the wireless communication device based at least in part on the at least one value of the at least one metric. In some examples, the apparatus may also include means for implementing one or more aspects of the method for wireless communication described above with respect to the second set of illustrative examples.

In a ninth set of illustrative examples, an apparatus for assessing the quality of end-to-end connectivity for a wireless communication device is described. In one example, the apparatus may include means for monitoring data generated from existing traffic of the wireless communication device to obtain information related to connectivity quality; means for determining at least one value of at least one metric based at least in part on the obtained information, the obtained information comprising at least one round trip time (RTT); determining a statistic of the at least one metric; and means for assessing the quality of end-to-end connectivity for the wireless communication device based at least in part on the determined statistic of the at least one metric. In some examples, the apparatus may also include means for implementing one or more aspects of the method for wireless communication described above with respect to the third set of illustrative examples.

In a tenth set of illustrative examples, a computer program product for assessing the quality of end-to-end connectivity for a wireless communication device is described. The computer program product may include a non-transitory computer-readable medium storing instructions executable by a processor to monitor data generated from existing traffic of the wireless communication device; determine a formation of a gap in at least one data stream of the existing traffic by computing a statistic comprising a difference between a time of a most recent in-order arrival and a time of a most recent arrival; determine at least one value of at least one metric, the at least one metric based at least in part on the formation of the gap; and assess the quality of end-to-end connectivity for the wireless communication device based at least in part on the at least one value of the at least one metric. In some examples, the instructions may also be executable by the processor to implement one or more aspects of the method for wireless communication described above with respect to the first set of illustrative examples.

In an eleventh set of illustrative examples, a computer program product for assessing the quality of end-to-end connectivity for a wireless communication device is described. The computer program product may include a non-transitory computer-readable medium storing instructions executable by a processor to monitor data generated from networking operations caused by existing traffic of the wireless communication device to obtain information related to connectivity quality; determine at least one value of at least one metric based at least in part on the obtained information, the obtained information comprising at least one of a success event, an error event, or a combination thereof, occurring in the wireless communication device; and assess the quality of end-to-end connectivity for the wireless communication device based at least in part on the at least one value of the at least one metric. In some examples, the instructions may also be executable by the processor to implement one or more aspects of the method for wireless communication described above with respect to the second set of illustrative examples.

In a twelfth set of illustrative examples, a computer program product for assessing the quality of end-to-end connectivity for a wireless communication device is described. The computer program product may include a non-transitory computer-readable medium storing instructions executable by a processor to monitor data generated from existing traffic of the wireless communication device to obtain information related to connectivity quality; determine at least one value of at least one metric based at least in part on the obtained information, the obtained information comprising at least one round trip time (RTT); determine a statistic of the at least one metric; and assess the quality of end-to-end connectivity for the wireless communication device based at least in part on the determined statistic of the at least one metric. In some examples, the instructions may also be executable by the processor to implement one or more aspects of the method for wireless communication described above with respect to the third set of illustrative examples.

Further scope of the applicability of the described methods and apparatuses will become apparent from the following detailed description, claims, and drawings. The detailed description and specific examples are given by way of illustration only, since various changes and modifications within the spirit and scope of the description will become apparent to those skilled in the art.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1:
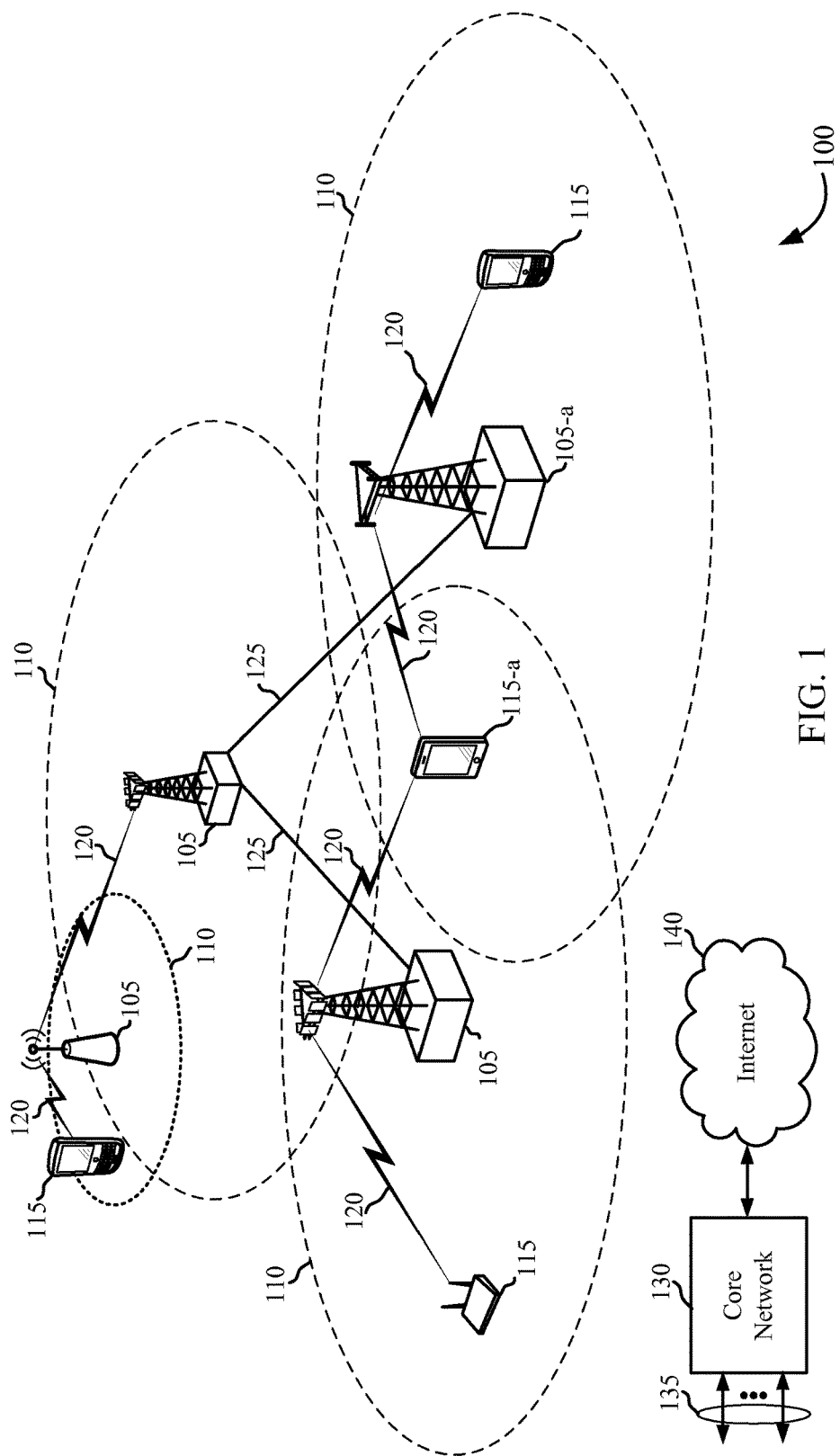
FIG. 1 shows an example wireless communications system.

Performance of wireless communication devices in general may depend, at least in part, on the quality of end-to-end connectivity. Such devices may include applications that may depend on the quality of an end-to-end connection. For example, a video streaming application may require a certain quality in order to provide an enjoyable user experience in video streaming (e.g, without interruptions). Further, the user experience with web browsing applications may require a certain quality in order to provide an acceptable user experience, such as in the time taken to load a web-page.

A wireless communication device may be configured to determine or assess the quality of end-to-end connectivity. The device may monitor data generated from existing traffic to obtain information related to connectivity quality. For example, the device may obtain information (e.g., indicators) at the transport layer or above that may serve as a metric or a statistic, or may allow the device to calculate, compute or otherwise determine a value of one or more metrics or statistics. The device may assess the quality of end-to-end connectivity based at least in part on the value(s) of the metric(s) and/or the statistic(s). In various examples described herein, quality of the airlink and quality of the backhaul (e.g., congestion) are factored into the assessment.

In some examples, the obtained information may include one or more transmission control protocol (TCP) statistics and/or real-time transport protocol (RTP) statistics (e.g., that relate to sequence number gaps, gaps in data flow, round-trip times, etc.). Alternatively or additionally, the obtained information may include one or more domain name system (DNS) statistics (e.g., that relate to DNS query response time, DNS error message or code, etc.). Further, alternatively or additionally, the obtained information may include one or more notifications from an application (e.g., exceptions, intents, message logs, return codes, etc.) running on the device. One or more error events may be identified from the notification(s), and may be used to generate or determine one or more metrics or statistics.

In some examples, the wireless communication device may perform or cause a user to perform an action to improve connectivity quality for the wireless communication device based at least in part on a result of the assessing. For example, if the device is currently using a WiFi connection and the quality of end-to-end connectivity thereof is assessed to be "bad" or otherwise degraded (e.g., sufficiently degraded compared to a threshold), the device may switch to using a different WiFi connection, an LTE (long term evolution) connection, etc. that may have better end-to-end connectivity (e.g., quality assessed as described herein). As a result, various examples may be used to assess multiple access interfaces (WiFi, WLAN, LTE, 3G, etc.). The quality of the connectivity on each interface may be different because they: may operate over different spectra and different technologies; may be served by different network equipment that may be located at different places, and may have different transmission power; may traverse different backhaul paths to the Internet; and/or, may have different levels of congestion due to the presence of other users.

The following description provides examples, and is not limiting of the scope, applicability, or configuration set forth in the claims. Changes may be made in the function and arrangement of elements discussed without departing from the spirit and scope of the disclosure. Various examples may omit, substitute, or add various procedures or components as appropriate. For instance, the methods described may be performed in an order different from that described, and various steps may be added, omitted, or combined. Also, features described with respect to certain examples may be combined in other examples.

Referring first to FIG. 1, an example wireless communication system 100 may include a plurality of UEs 115 that may communicate with a core network 130 via one or more base stations (or cells) 105. The base stations 105 may communicate with the UEs 115 under the control of a base station controller (not shown), which may be part of the core network 130.

Base stations 105 may communicate control information and/or user data with the core network 130 through backhaul links 135 (e.g., S1, etc.). In some examples, the base stations 105 may communicate, either directly or indirectly, with each other over backhaul links 125 (e.g., X2, etc.), which may be wired or wireless communication links. The wireless communication system 100 may support operation on multiple carriers (waveform signals of different frequencies). Multi-carrier transmitters can transmit modulated signals simultaneously on the multiple carriers. For example, each communication link 120 may be a multi-carrier signal modulated according to various radio technologies. Each modulated signal may be sent on a different carrier and may carry control information (e.g., reference signals, control channels, etc.), overhead information, data, etc.

The base stations 105 may wirelessly communicate with the UEs 115 via one or more base station antennas. Each of the base station 105 sites may provide communication coverage for a respective geographic coverage area 110. In some examples, the base stations 105 may be referred to as a base transceiver station, a radio base station, an access point, a radio transceiver, a basic service set (BSS), an extended service set (ESS), a NodeB, eNodeB (eNB), Home NodeB, a Home eNodeB, or some other suitable terminology. The geographic coverage area 110 for a first base station 105 may be divided into sectors making up a portion of the coverage area (not shown). The wireless communication system 100 may include base stations 105 of different types (e.g., macro, micro, and/or pico base stations). There may be overlapping coverage areas for different technologies.

The wireless communication system 100 may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

The UEs 115 are dispersed throughout the wireless communication system 100, and each UE 115 may be stationary or mobile. A UE 115 may be ground based or located on an airborne vehicle. A UE 115 may also be referred to as a mobile device, a mobile station, a subscriber station, a mobile unit, a subscriber unit, a wireless unit, a remote unit, a UE, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may be a two-way radio, a radio cellular phone, a personal digital assistant (PDA), a wireless modem, a wireless communication device, a handheld device, a tablet computer, a laptop computer, a cordless phone, a wireless local loop (WLL) station, or the like.

The communication links 120 shown in wireless communication system 100 may include uplink (UL) and/or downlink (DL) transmissions from a UE 115 to base stations 105. The downlink transmissions may also be called forward link transmissions while the uplink transmissions may also be called reverse link transmissions. The communication links 120 may utilize different air interfaces of different radio access technologies (RATs).

In some examples, the UEs 115 may communicate with the Internet 140 via one or more of the base stations 105 and the core network 130. In various examples described herein, it may be desirable to assess the quality of end-to-end connectivity for a particular UE 115-a, for example. As illustrated in FIG. 1, the UE 115-a may communicate with a particular base station 105-a via communication link 120. The base station 105-a may communicate with the core network 130 to provide access to the Internet 140 for the UE 115-a. Further, as noted above, the base station 105-a may communicate with the core network 130 through one of the backhaul links 135.

To assess the quality of end-to-end connectivity for the UE 115-a in this example, the entire connection from the UE 115-a to the base station 105 via the communication link 120, to the core network 130 via the backhaul link 135, to the Internet 140 may be addressed.

Various data may be used to assess the quality of end-to-end connectivity. As discussed herein, data that is routinely collected regarding the performance of the wireless communication system 100 and its components may be used. This may be advantageous because such data is generated from existing traffic and is readily available to the UE 115-a. Thus, no additional traffic may be generated specifically for assessing the quality of end-to-end connectivity, which may occupy communication resources and may cause congestion. Examples of data generated from existing traffic include packet sequence number information, round-trip-time information, reception information, transmission information, TCP statistics, RTP statistics, DNS query information, log messages, return (e.g., error) codes and the like.

Figure 2A:
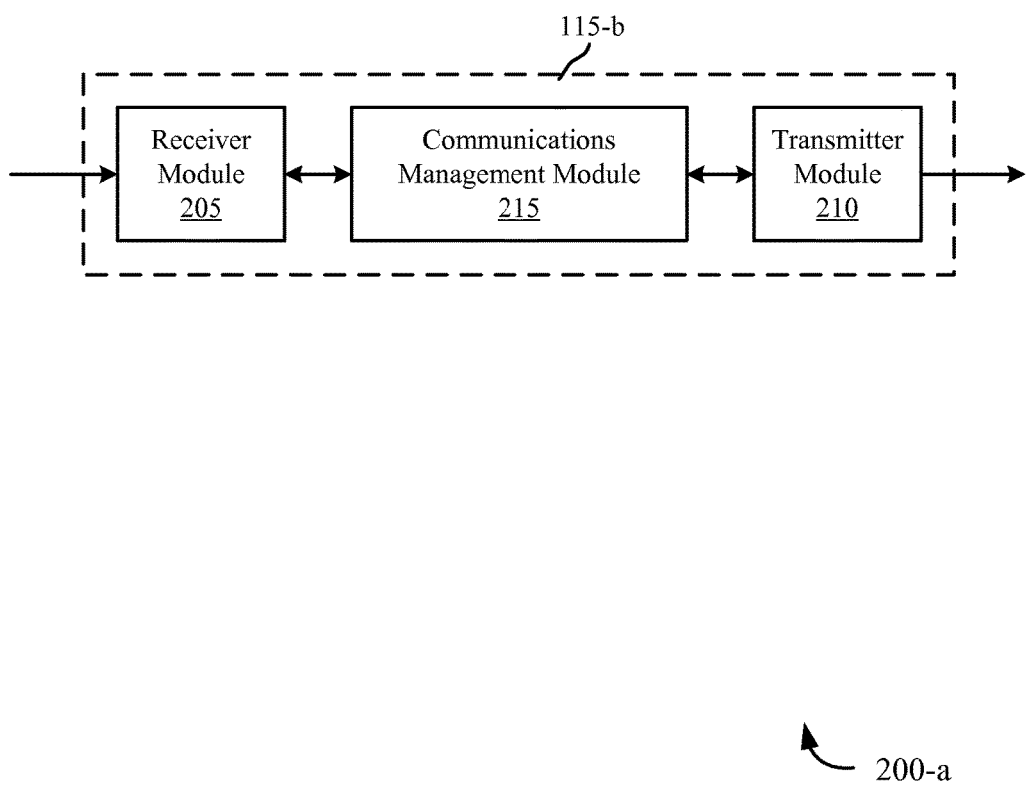
FIG. 2A shows a block diagram of an example of a user equipment for implementing functionality in the wireless communications system.

Turning now to FIG. 2A, a block diagram 200-a of an example of a user equipment (UE) 115-b. The UE 115-b may be an example of one or more aspects of a UE 115 described with reference to FIG. 1. The UE 115-b may include a receiver module 205, a transmitter module 210 and a communications management module 215. The UE 115-b may also include a processor (not shown), which may be part of the communications management module, for example. Each of these components may be in communication with each other.

The components of the UE 115-b may, individually or collectively, be implemented with one or more application-specific integrated circuits (ASICs) adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by one or more general or application-specific processors.

The receiver module 205 may receive information such as packets, user data, and/or control information including synchronization and pilot signals. The received information may be demodulated, descrambled, de-interleaved, and/or decoded. The information may be passed on to the communications management module 215, and to other components of the UE 115-b as appropriate or desired.

The receiver module 205 may include a single receiver or multiple receivers. For example, the receiver module 205 may include N receive antennas and R RF chains (not shown), where R is generally less than or equal to N. Each RF chain may include an RF module and an analog-to-digital converter (ADC). During operation, signals received by a receive antenna may be provided to an input of an RF chain. At the RF chain, the signals are processed (e.g., amplified, downconverted, filtered, etc.) by an RF module and digitized by the ADC. The output of the RF chain may be provided to the demodulator for further processing. The demodulator may combine signals received from multiple antennas using receive diversity techniques to increase the SINR of the received signals. The demodulator may use a suitable signal combining technique such as equal gain combining, maximum ratio combining (MRC), and the like. The demodulator and RF chains may use interference cancellation techniques to further provide interference cancellation and/or suppression (e.g., interference rejection combining, successive interference cancellation, and the like).

The transmitter module 210 may transmit information such as packets, user data, and/or control information including synchronization and pilot signals. The transmitted information may be modulated, scrambled, interleaved, and/or coded. The information may be received from the communications management module 215, and from other components of the UE 115-b as appropriate or desired. In some examples, the transmitter module 210 may be collocated with the receiver module 205 in a transceiver module (not shown). The transmitter module 210 may include a single antenna, or it may include a plurality of antennas. The communications management module 215 may employ the transmitter module 210 and the receiver module 205 (or a transceiver module) to perform communications with a base station 105 as described above with respect to FIG. 1.

Further, the communications management module 215 may implement various aspects described herein for assessing the quality of end-to-end connectivity for the UE 115-b. For example, the communications management module 215 may be configured to monitor data that is generated from existing traffic. From that data, the communications management module 215 may obtain information related to connectivity quality. The communications management module 215 may use the obtained information to assess the end-to-end connectivity for the device 115-b.

Figure 2B:
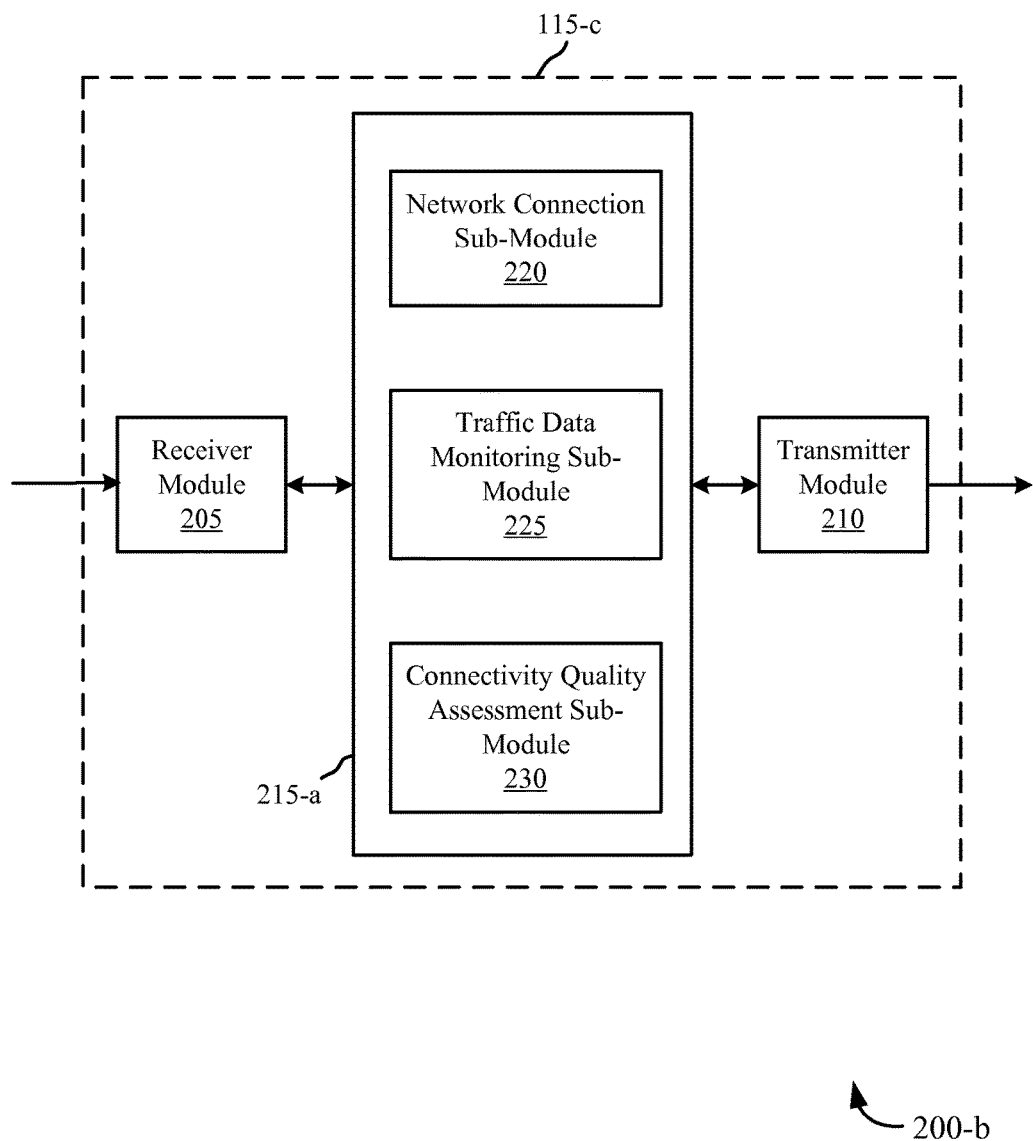
FIG. 2B shows a block diagram of another example of a user equipment for implementing functionality in the wireless communications system.

FIG. 2B shows a block diagram 200-b of an example of a UE 115-c. The UE 115-c may be an example of one or more aspects of a UE 115 described with reference to FIGS. 1, and/or 2A. The UE 115-c may include a receiver module 205, a transmitter module 210 and a communications management module 215-a. The UE 115-c may also include a processor (not shown), which may be part of the communications management module, for example. Each of these components may be in communication with each other.

The components of the UE 115-c may, individually or collectively, be implemented with one or more application-specific integrated circuits (ASICs) adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by one or more general or application-specific processors.

The receiver module 205 and the transmitter module 210 may be configured and may be employed as described above with respect to FIG. 2A. The communications management module 215-a may be configured and may implement operations as described above with respect to the communications management module 215 of FIG. 2A.

Further, as illustrated in FIG. 2B, the communications management module 215-a may include a network connection sub-module 220 for connecting the wireless communication device 115-c to the network 130 via one or more access interfaces. The network connection sub-module 220 may be configured to determine which interfaces (e.g., sockets) are active (e.g., have data flow) and in which direction (e.g., uplink (UL) or downlink (DL)).

For example, the network connection sub-module 220 may determine that a socket is active in the DL direction if the socket is in an established or connected state and the time since the last data received is within a certain threshold (e.g., time between active determination and last reception of data is less than a preconfigured or configurable threshold time value). The network connection sub-module 220 may determine that a socket is active in the UL direction if the socket is in an established or connected state and the time since the last data sent or transmitted is within a certain threshold (e.g., time between active determination and last transmission of data is less than a preconfigured or configurable threshold time value). The threshold may be set or otherwise determined based at least in part on a sampling interval (e.g., time interval for which data is monitored). As described herein, some examples may select sockets for use in assessing the quality of end-to-end connectivity based on their uplink and downlink activity as determined above; for example, some examples may consider (e.g., select) sockets that are active in the DL direction but not in the UL direction for use in assessing the quality of end-to-end connectivity.

The communications management module 215-a also may include a traffic data monitoring sub-module 225 for performing operations to implement aspects described herein. For example, the traffic data monitoring sub-module 225 may be configured to monitor data generated from existing traffic to obtain information related to connectivity quality, for example, corresponding to interfaces and/or sockets selected or otherwise identified by the network connection sub-module 220. The traffic data monitoring sub-module 225 may monitor the data for a certain time interval (e.g., sampling interval). In some examples, the traffic data monitoring sub-module 225 may be configured to recognize or otherwise identify relevant information (e.g., related to connectivity quality) in the data. As described herein, some examples may involve confirming that the obtained information relates to connectivity quality (e.g., indicates or implies disconnection or degradation), at least for some of the obtained information. Thus, the traffic data monitoring sub-module 225 also may be configured to perform or at least initiate confirmation operations.

The communications management module 215-a may further include a connectivity quality assessment sub-module 230 for performing operations to implement aspects described herein. For example, the connectivity quality assessment sub-module 230 may be configured to assess the end-to-end connectivity for the device 115-c using the information obtained by the traffic data monitoring sub-module 225.

Figure 2C:
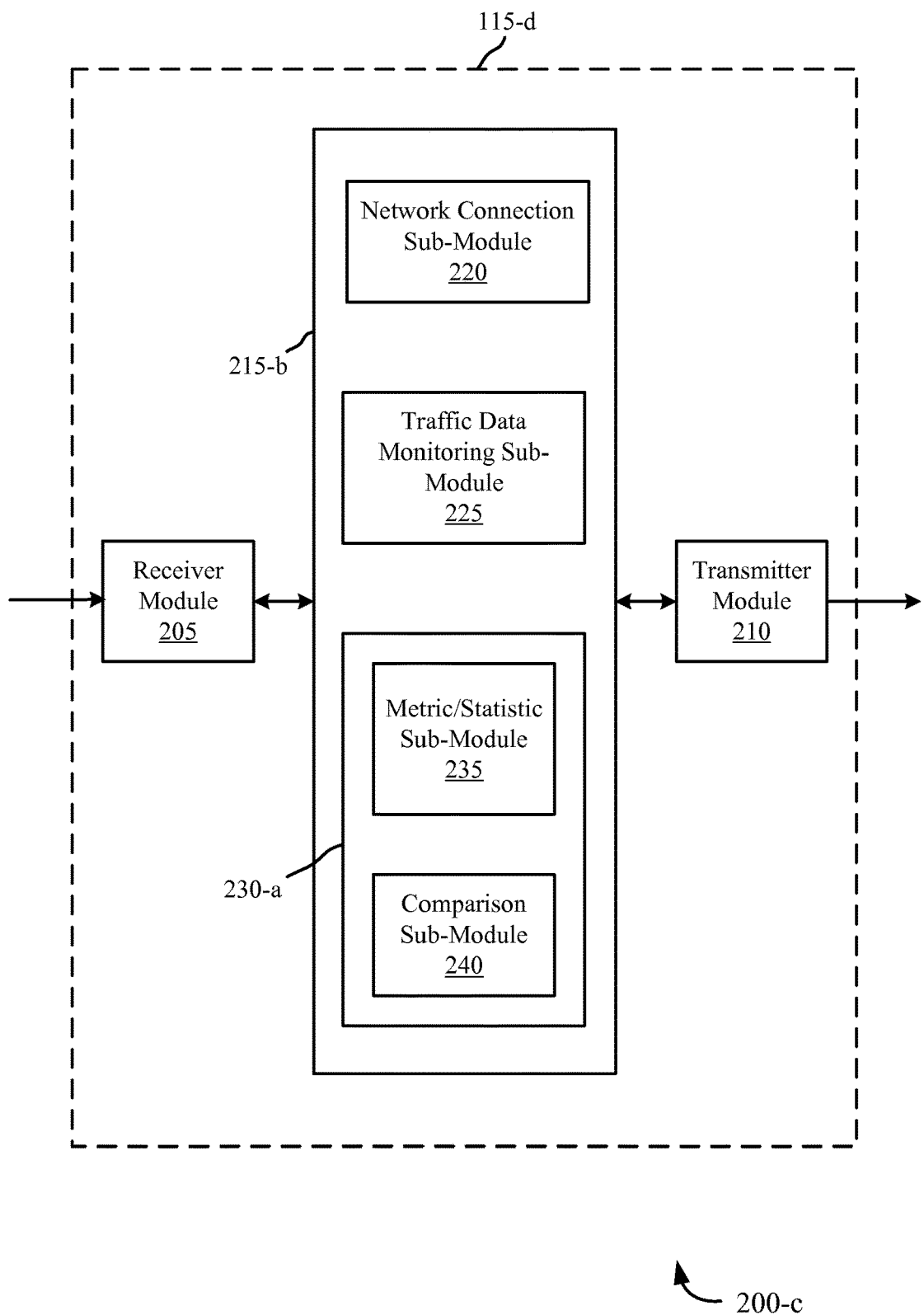
FIG. 2C shows a block diagram of yet another example of a user equipment for implementing functionality in the wireless communications system.

FIG. 2C shows a block diagram 200-c of an example of a UE 115-d. The UE 115-d may be an example of one or more aspects of a UE 115 described with reference to FIGS. 1, 2A and/or 2B. The UE 115-d may include a receiver module 205, a transmitter module 210 and a communications management module 215-b. The UE 115-d may also include a processor (not shown), which may be part of the communications management module, for example. Each of these components may be in communication with each other.

The components of the UE 115-d may, individually or collectively, be implemented with one or more application-specific integrated circuits (ASICs) adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by one or more general or application-specific processors.

The receiver module 205 and the transmitter module 210 may be configured and may be employed as described above with respect to FIG. 2A. The communications management module 215-b may be configured and may implement operations as described above with respect to the communications management module 215 of FIG. 2A and/or as described above with respect to the communications management module 215-a of FIG. 2B. Thus, in some examples the communications management module 215-b may include a network connection sub-module 220, a traffic data monitoring sub-module 225 and connectivity quality assessment sub-module 230-a, each of which may be configured and may implement operations as described above with respect to FIG. 2B.

Further, the connectivity quality assessment sub-module 230-a may include a metric/statistic sub-module 235 and a comparison sub-module 240. The metric/statistic sub-module 235 may be configured to calculate, compute or otherwise determine one or more metrics and/or statistics using the information obtained by the traffic data monitoring sub-module 225.

One such metric may be referred to as a gap indicator. TCP (and RTP) uses a sequence number to define an ordering on the packets/bytes to be transported. If a packet/byte is lost in the network, the next arriving packet/byte will not have the expected (e.g., consecutive) sequence number. This may be referred to as a gap in the sequence of packets/bytes or a gap in the data stream. The sequence number may be a parameter that is used internally within the TCP protocol, and the traffic data monitoring sub-module 225 may not have direct access to the sequence number of the arriving packets/bytes. Therefore, the traffic data monitoring sub-module 225 may utilize other information that may indicate that a gap has formed in the sequence numbers of the arriving data stream.

The information obtained by the traffic data monitoring sub-module 225 for determining (e.g., computing) the gap indicator may include a time that has elapsed since the most recent reception of a packet/byte in sequence number order for the particular connection (e.g., selected interface/socket) and a time that has elapsed since the most recent reception of a packet/byte, whether in sequence number order or not, for the particular connection.

The gap indicator may be determined (in the DL direction) as a difference between the time that has elapsed since the most recent reception of a packet/byte in sequence number order and the time that has elapsed since the most recent reception of a packet/byte. In this case, sockets that are active in the DL direction but not in the UL direction may be used in assessing the quality of end-to-end connectivity (e.g., to avoid acknowledgements for UL data being mistaken for out-of-order data arrival).

In equation form:

$$\text{Gap indicator} = (T_{IN\_ORDER\_RECEPTION} - T_{ANY\_RECEPTION}) \quad \text{Eq. 1}$$

The gap indicator will be zero if the receptions are all in order. If a gap forms, the gap indicator will become non-zero (until the gap is filled by a retransmission and the gap indicator becomes zero). The non-zero value of the gap indicator may vary depending on the differences in times discussed above. During the monitoring or sampling interval, multiple receptions (both in-order and not) may occur; thus, multiple values of the gap indicator may be determined for that interval.

Individual values of the gap indicator may be compared to a threshold. The comparison sub-module 240 may be configured to make such comparisons. In some examples, a single value of the gap indicator that exceeds the threshold may be sufficient for the connectivity quality assessment sub-module 230-a to assess the connectivity quality as poor or bad. In other examples, if values of the gap indicator exceed the threshold frequently (e.g., more than a certain number of values within the monitoring/sampling interval), the connectivity quality assessment sub-module 230-a to assess the connectivity quality as poor or bad. The certain number of values may thus be compared to another threshold to determine sufficiency of the frequency for assessing the connectivity quality as poor or bad. Frequent gap indicators with values exceeding the threshold may indicate that packets/bytes are frequently lost, and may imply a poor/bad or degraded backhaul, for example.

In the TCP protocol, when a segment is lost but subsequently multiple segments arrive, then for each subsequently arriving segment the recipient may send an acknowledgment message (ACK) requesting the lost sequence number, until the lost segment is retransmitted and successfully received. Alternatively, in some examples the formation of a gap in the data stream may be inferred from detecting the sending of one or more acknowledgement messages (ACKs) that request a sequence number. In such case, the metric may be the number of ACKs requesting a sequence number that occur within the monitoring/sampling interval. The metric may or may not include duplicate ACKs that request a same sequence number, as appropriate or desired. Thus, in some examples, ACKs that request a same sequence number may be counted once for the metric. In other examples, duplicate ACKs may be counted multiple times for the metric. In any case, the metric value (number of ACKs counted) may be compared to a threshold by the comparison sub-module 240. If the metric exceeds the threshold, the connectivity quality assessment sub-module 230-a may assess the connectivity quality as poor or bad. The metric may also be the frequency with which duplicate ACKs occur within the monitoring/sampling interval.

Another alternative may be to infer formation of a gap directly from a discontinuity in the sequence numbers. This approach may be employed if the sequence numbers for receptions are available in the data generated from existing traffic.

For data streams in the UL direction, in some examples retransmissions of packets/bytes resulting from or in response to ACKs requesting a packet/byte with an identified sequence number may indicate the formation of a gap. Thus, for the UL direction, the metric may be the number of such retransmissions that occur within the monitoring/sampling interval. The metric may or may not include duplicate retransmissions of a same packet/byte or sequence number, as appropriate or desired. Thus, in some examples, retransmissions of a same packet/byte or sequence number may be counted once for the metric. In other examples, duplicate retransmissions may be counted multiple times for the metric. In any case, the metric value (number of retransmissions counted) may be compared to a threshold by the comparison sub-module 240. If the metric exceeds the threshold, the connectivity quality assessment sub-module 230-a may assess the connectivity quality as poor or bad.

Another metric, which also may be employed for TCP and/or RTP, may be a round trip time (RTT) for messages (e.g., request and response, message and acknowledgement, etc.). The RTT may be calculated, computed or otherwise determined in any known or hereafter developed manner. For example, the RTT may be determined from timing information (e.g., timestamps). The RTT may be obtained as part of the statistics maintained by the operating system/kernel described in the next paragraph. The kernel may compute the RTT based on the timestamps embedded in the packet headers, or using the system clock time difference between the message transmission and the ACK reception. The RTT may be determined using UL data transfer or using DL data transfer, as appropriate or desired.

Some operating systems of wireless communication devices may maintain statistics for existing TCP and/or RTP connections. For example, in Linux® and Android™ operating systems, these statistics may be obtained from the Linux® kernel and the Android™ kernel, respectively. As such, these statistics may be data generated by existing traffic from which information may be obtained in accordance with aspects described herein.

Figure 2D:
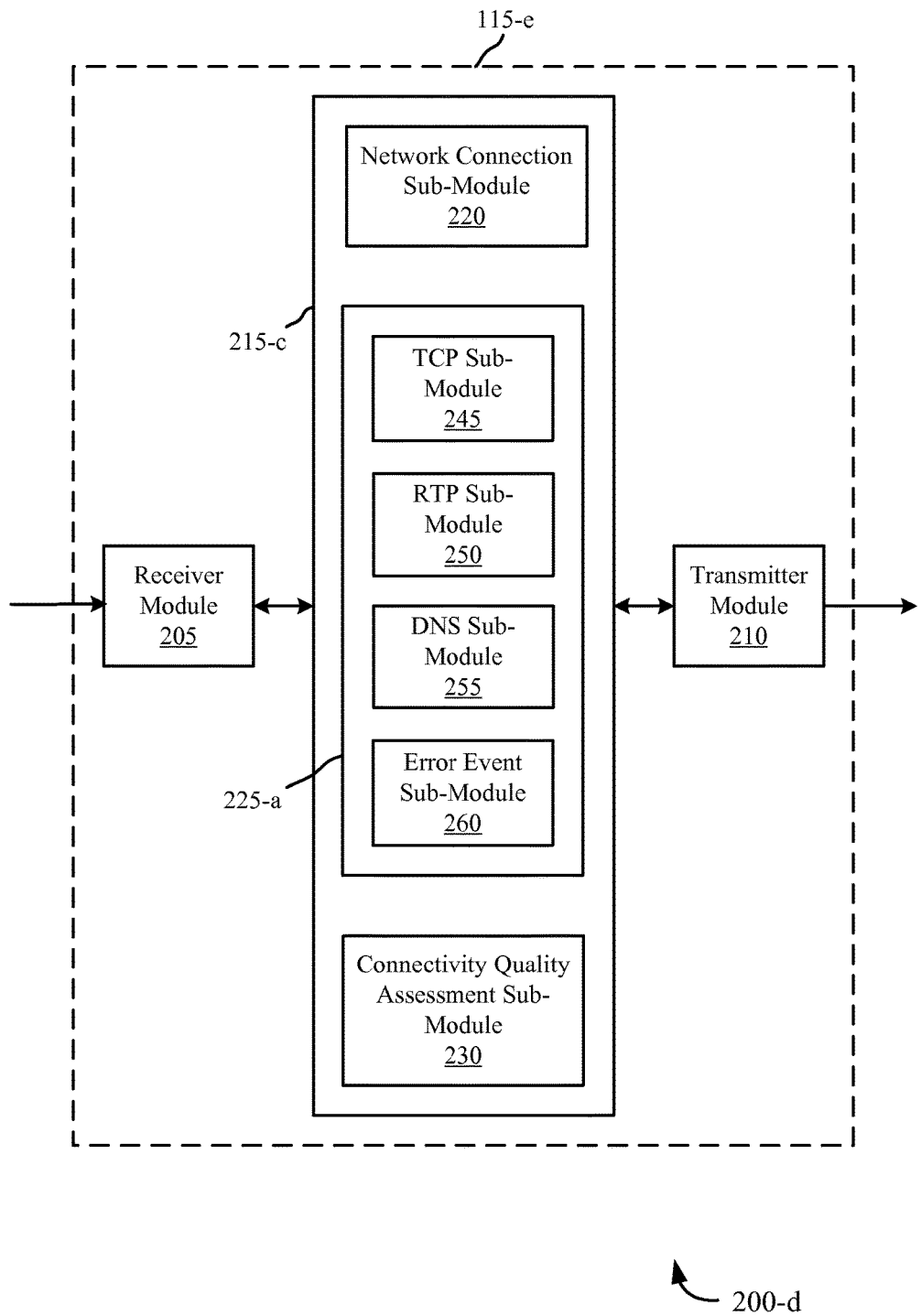
FIG. 2D shows a block diagram of still another example of a user equipment for implementing functionality in the wireless communications system.

FIG. 2D shows a block diagram 200-d of an example of a UE 115-e. The UE 115-e may be an example of one or more aspects of a UE 115 described with reference to FIGS. 1, 2A, 2B and/or 2C. The UE 115-e may include a receiver module 205, a transmitter module 210 and a communications management module 215-c. The UE 115-e may also include a processor (not shown), which may be part of the communications management module, for example. Each of these components may be in communication with each other.

The components of the UE 115-e may, individually or collectively, be implemented with one or more application-specific integrated circuits (ASICs) adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by one or more general or application-specific processors.

The receiver module 205 and the transmitter module 210 may be configured and may be employed as described above with respect to FIG. 2A. The communications management module 215-c may be configured and may implement operations as described above with respect to the communications management module 215 of FIG. 2A, and/or as described above with respect to the communications management module 215-a of FIG. 2B and/or as described above with respect to the communications management module 215-b of FIG. 2C. Thus, in some examples the communications management module 215-c may include a network connection sub-module 220, a traffic data monitoring sub-module 225-a and connectivity quality assessment sub-module 230, each of which may be configured and may implement operations as described above with respect to FIGS. 2B and/or 2C.

Further, the traffic data monitoring sub-module 225-a may include a TCP sub-module 245, an RTP sub-module 250, a DNS sub-module 255 and/or an error event sub-module 260. The TCP sub-module 245 and the RTP sub-module 250 may be configured to obtain information related to connectivity quality for TCP connections and RTP connections, respectively. Thus, in some examples, TCP sub-module 245 and the RTP sub-module 250 may obtain information for the connectivity quality assessment sub-module 230 to use to determine one or more metrics for assessing end-to-end connectivity quality, such as described above with respect to FIG. 2C for example.

The DNS sub-module 255 may be configured to obtain information related to connectivity quality from existing data regarding DNS messages. The obtained information may include information regarding DNS queries. Applications perform DNS queries to resolve the IP addresses of hosts. The information regarding DNS queries may include DNS messages (DNS queries and DNS responses) with timestamps.

A DNS response time/RTT (round trip time) may be correlated with the connectivity quality (e.g., quality of a connection). For example, whenever packets are buffered for a longer time, the DNS response time/RTT will increase. Also, if either the DNS query packet or the DNS response packet is lost, the DNS query will take even longer to be resolved (e.g., due to timeouts and retries), resulting in a corresponding greater DNS response time/RTT. Thus, the DNS response time/RTT may serve as a metric for assessing connectivity quality.

The DNS response time/RTT may be determined as a difference between the time a DNS query is sent (when an application requests to resolve the IP address for a hostname) and the time that a corresponding DNS query response is received (by the requesting application). In equation form:

$$\text{DNS RTT} = (T_{DNS\_RESPONSE\_RECEIVED} - T_{DNS\_QUERY\_SENT}) \qquad \text{Eq. 2}$$

Thus, the DNS sub-module 255 may obtain the information ($T_{DNS\_RESPONSE\_RECEIVED}$ and $T_{DNS\_QUERY\_SENT}$) from data generated by existing traffic and provide such information to the connectivity quality assessment sub-module 230 for calculation of the DNS RTT and assessment of the end-to-end connectivity quality using the calculated DNS RTT.

In some examples, the connectivity quality assessment sub-module 230 may be configured to determine statistics (e.g., (mean/median/a particular percentile) of the DNS response time/RTT based on multiple samples. Higher percentiles (e.g., 90th percentile) of the DNS response time/RTT may imply delay resulting when the buffer is close to being full. Having lower percentiles (e.g., 10th percentile) of the DNS response time/RTT that close to the higher percentiles may imply that the queues are close to being full most of the time, thus indicating that the network may be congested. Thus, a gap between the higher and lower percentiles of the DNS response time/RTT may be used as a metric for determining the end-to-end connectivity quality. A large gap may indicate that the queue is not always full and the network is not congested. A small gap may indicate congestion.

In some cases, an access point (AP) may host a DNS server, and upon losing backhaul connectivity, the AP may respond to DNS queries from the UE 115-e with an explicit error message without causing much delay. In such cases, the response time may be small but the DNS resolver will return an error code. Therefore, alternatively or additionally to using the DNS response time/RTT as one indicator (metric) of poor connectivity, the return of an error code from the DNS resolver may be used as an indicator/metric. The DNS sub-module 255 may be configured to obtain error codes as information related to connectivity quality generated from networking operations caused by existing traffic. The DNS sub-module 255 may provide the information (occurrences of DNS error codes) to the connectivity quality assessment sub-module 230 for calculation of one or more metrics or statistics and assessment of the end-to-end connectivity quality using the metric(s)/statistic(s).

In some examples, the DNS sub-module 255 may be configured to confirm the lack of connectivity implied by an occurrence of a DNS error code. For example, the DNS sub-module 255 may perform another DNS query for a preconfigured server whose hostname is valid and/or TCP connection setup to a preconfigured server. If this DNS query attempt or TCP connection attempt also results in the generation of an error code or other failure, then it confirms the lack of connectivity to the network. This confirmation may be employed to distinguish from the case where the error code happened, for example, because of a DNS request that was invalid or was for a host that does not exist, which may happen even when there is connectivity.

The error event sub-module 260 may be configured to obtain information related to connectivity quality generated from networking operations caused by existing traffic, for example, regarding error events in the application layer. The error event sub-module 260 may monitor log messages or return codes of application layer operations in order to identify error events in the application layer. For example: log messages may indicate that a video streaming application is experiencing poor throughput and/or the video playback is interrupted; error codes may indicate that a socket operation to write bytes on a socket timed out; or error codes may indicate that a HTTP layer GET operation timed out.

The error event sub-module 260 may provide the information (occurrences of log messages and/or return codes) to the connectivity quality assessment sub-module 230 for calculation of one or more metrics or statistics and assessment of the end-to-end connectivity quality using the metric(s)/statistic(s).

Figure 2E:
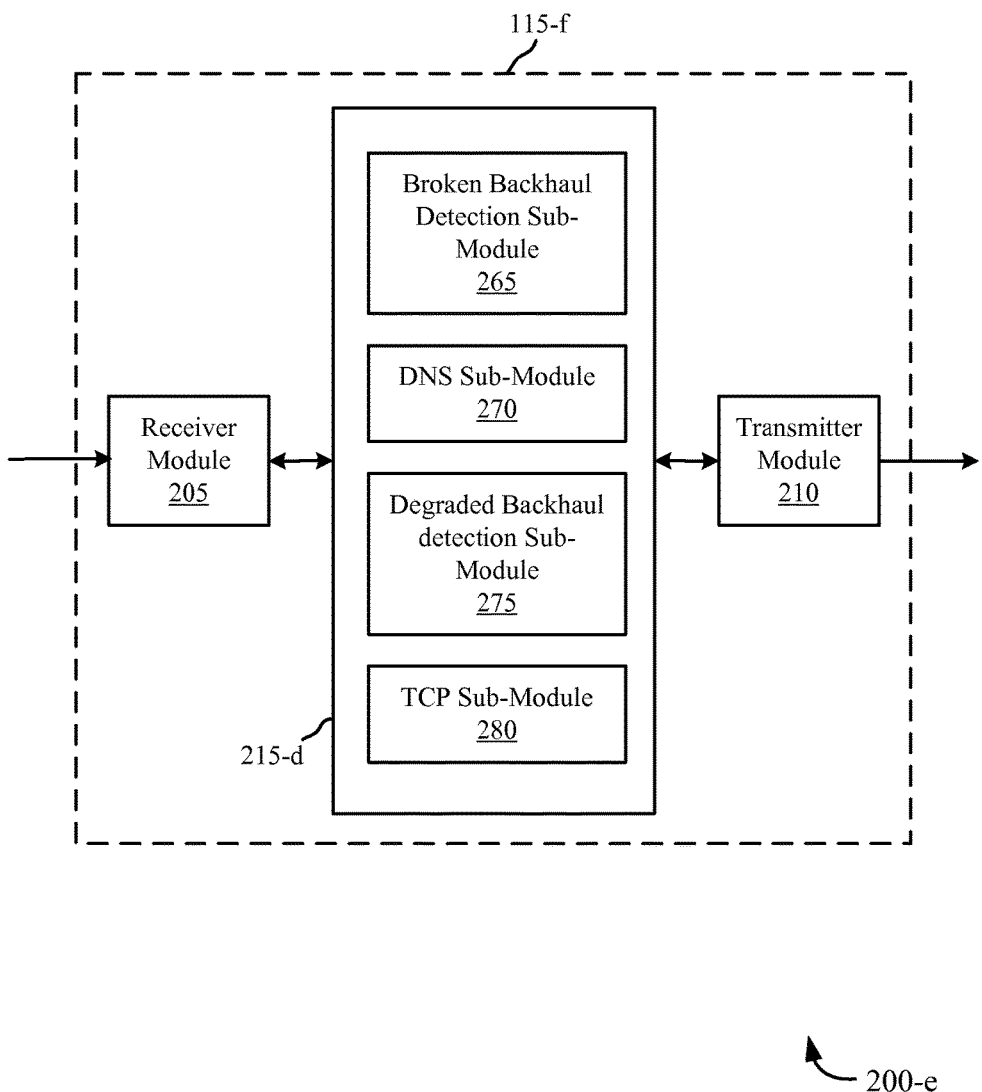
FIG. 2E shows a block diagram of yet another example of a user equipment for implementing functionality in the wireless communications system.

FIG. 2E shows a block diagram 200-e of an example of a UE 115-f. The UE 115-f may be an example of one or more aspects of a UE 115 described with reference to FIGS. 1, and/or 2A. The UE 115-f may include a receiver module 205, a transmitter module 210 and a communications management module 215-d. The UE 115-f may also include a processor (not shown), which may be part of the communications management module, for example. Each of these components may be in communication with each other.

The components of the UE 115-f may, individually or collectively, be implemented with one or more application-specific integrated circuits (ASICs) adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by one or more general or application-specific processors.

The receiver module 205 and the transmitter module 210 may be configured and may be employed as described above with respect to FIG. 2A. The communications management module 215-d may be configured and may implement operations as described above with respect to the communications management module 215 of FIG. 2A.

Further, as illustrated in FIG. 2B, the communications management module 215-d may include a broken backhaul detection sub-module 265, a DNS sub-module 270, a degraded backhaul detection sub-module 275 and/or a TCP sub-module 280.

The TCP sub-module 280 may be configured and may be employed as described above with respect to the TCP sub-module 245 in FIG. 2D. For example, the TCP sub-module 280 may periodically poll TCP statistics using a suitable software interface within the UE between the kernel and another program. The TCP sub-module 280 may provide suitable information (e.g., TCP statistics) obtained from data generated from existing traffic to the degraded backhaul detection sub-module 275 to allow the degraded backhaul detection sub-module 275 to process the information, e.g., calculate metric(s) such as described above, and assess whether the backhaul quality is degraded.

Operations of the TCP sub-module 280 may include, for each sampling interval: collection (or obtaining) of TCP diagnostics (or statistics) of all sockets; and, determination of which sockets to consider based on their recent activity (e.g., selection of sockets as described above. Examples of TCP diagnostics/statistics to collect/obtain for each TCP connection include TCP connection state; time since last packet was sent on the connection; time since last in-order data packet was received; time since last ACK was received; and round-trip time.

For each of the considered/selected sockets, the degraded backhaul detection sub-module 275 may compute a TQE (transport quality estimation) metric using the TCP statistics, and may declare a verdict on the backhaul (good or bad) based on the metric. If a majority of these sockets declare bad as the verdict, then the degraded backhaul detection sub-module 275 may declare a TQE fail. In some examples, the degraded backhaul detection sub-module 275 may be configured not to declare a TQE fail if there are errors in the TCP data stream(s) but the interface level throughput is above a threshold. Such a throughput level threshold approach also may be applied in other examples described herein.

For example, for each selected socket all valid samples from the past TIME_WINDOW (monitoring/sampling interval) may be considered. If the number of samples is greater or equal to a threshold, COUNT_THRESH, then a fraction may be computed of samples for which the gap indicator is greater than a threshold, GAP_THRESH. If the computed fraction is greater than a threshold, TQE_THRESH, the respective socket may be declared to be bad (e.g., poor connectivity quality) and may be marked as "bad." If not, the respective socket may be declared to be good (e.g., acceptable connectivity quality) and may be marked as "good." If the number of samples is less than the threshold COUNT_THRESH, then the respective socket may be indeterminate, and may be marked as "inconclusive."

If a ratio of the number of bad sockets to the number of good sockets is greater than a threshold, RATIO_THRESH, then the degraded backhaul detection sub-module 275 may declare a TQE fail. The thresholds and other operational parameters may be configured differently for various types of networks or access interfaces (e.g., SSID, RAT type, etc.).

Figure 2F:
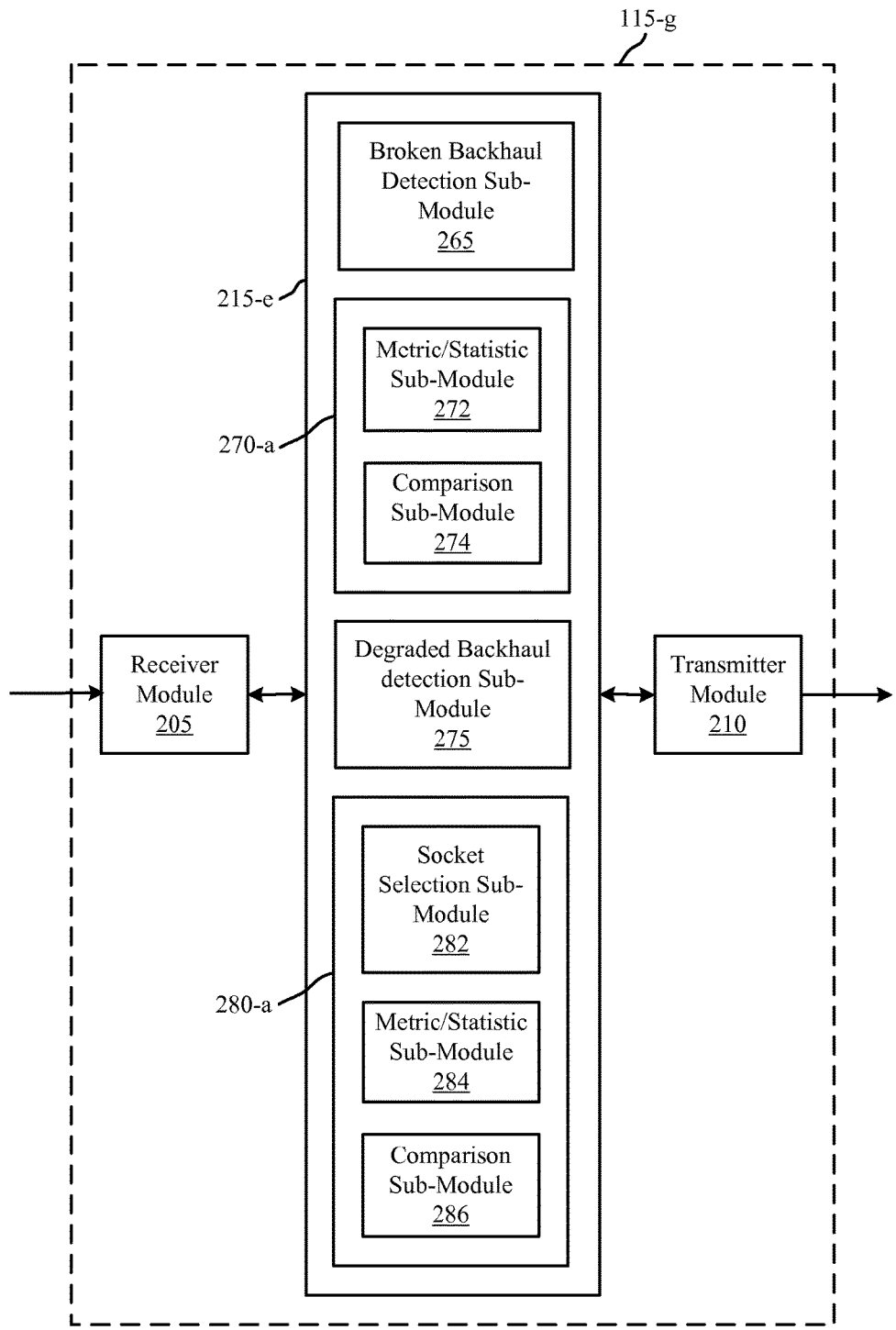
FIG. 2F shows a block diagram of still another example of a user equipment for implementing functionality in the wireless communications system.

FIG. 2F shows a block diagram 200-f of an example of a UE 115-g. The UE 115-g may be an example of one or more aspects of a UE 115 described with reference to FIGS. 1, 2A and/or 2E. The UE 115-g may include a receiver module 205, a transmitter module 210 and a communications management module 215-e. The UE 115-g may also include a processor (not shown), which may be part of the communications management module, for example. Each of these components may be in communication with each other.

The components of the UE 115-g may, individually or collectively, be implemented with one or more application-specific integrated circuits (ASICs) adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by one or more general or application-specific processors.

The receiver module 205 and the transmitter module 210 may be configured and may be employed as described above with respect to FIG. 2A. The communications management module 215-e may be configured and may implement operations as described above with respect to the communications management module 215 of FIG. 2A, and/or as described above with respect to the communications management module 215-a of FIG. 2B, and/or as described above with respect to the communications management module 215-d of FIG. 2E. Thus, in some examples the communications management module 215-e may include a broken backhaul detection sub-module 265, a DNS sub-module 270-a, a degraded backhaul detection sub-module 275 and/or a TCP sub-module 280-a, each of which may be configured and may implement operations as described above with respect to FIG. 2E.

Further, the DNS sub-module 270-a may include a metric/statistic sub-module 272 and a comparison sub-module 274. The metric/statistic sub-module 272 may be configured to calculate, compute or otherwise determine one or more metrics and/or statistics using the information obtained by the DNS sub-module 270-a, such as described above. The comparison sub-module 274 may be configured to make suitable comparisons for the determined DNS metric(s)/statistic(s), such as comparisons to various thresholds as described above.

The TCP sub-module 280-a may include a socket selection sub-module 282, a metric/statistic sub-module 284 and a comparison sub-module 274. The socket selection sub-module 282 may be configured to select or otherwise identify which sockets to consider, such as described above. The metric/statistic sub-module 272 may be configured to calculate, compute or otherwise determine one or more metrics and/or statistics using the information obtained by the TCP sub-module 280-a, such as described above. The comparison sub-module 274 may be configured to make suitable comparisons for the determined TCP metric(s)/statistic(s), such as comparisons to various thresholds as described above.

Figure 3:
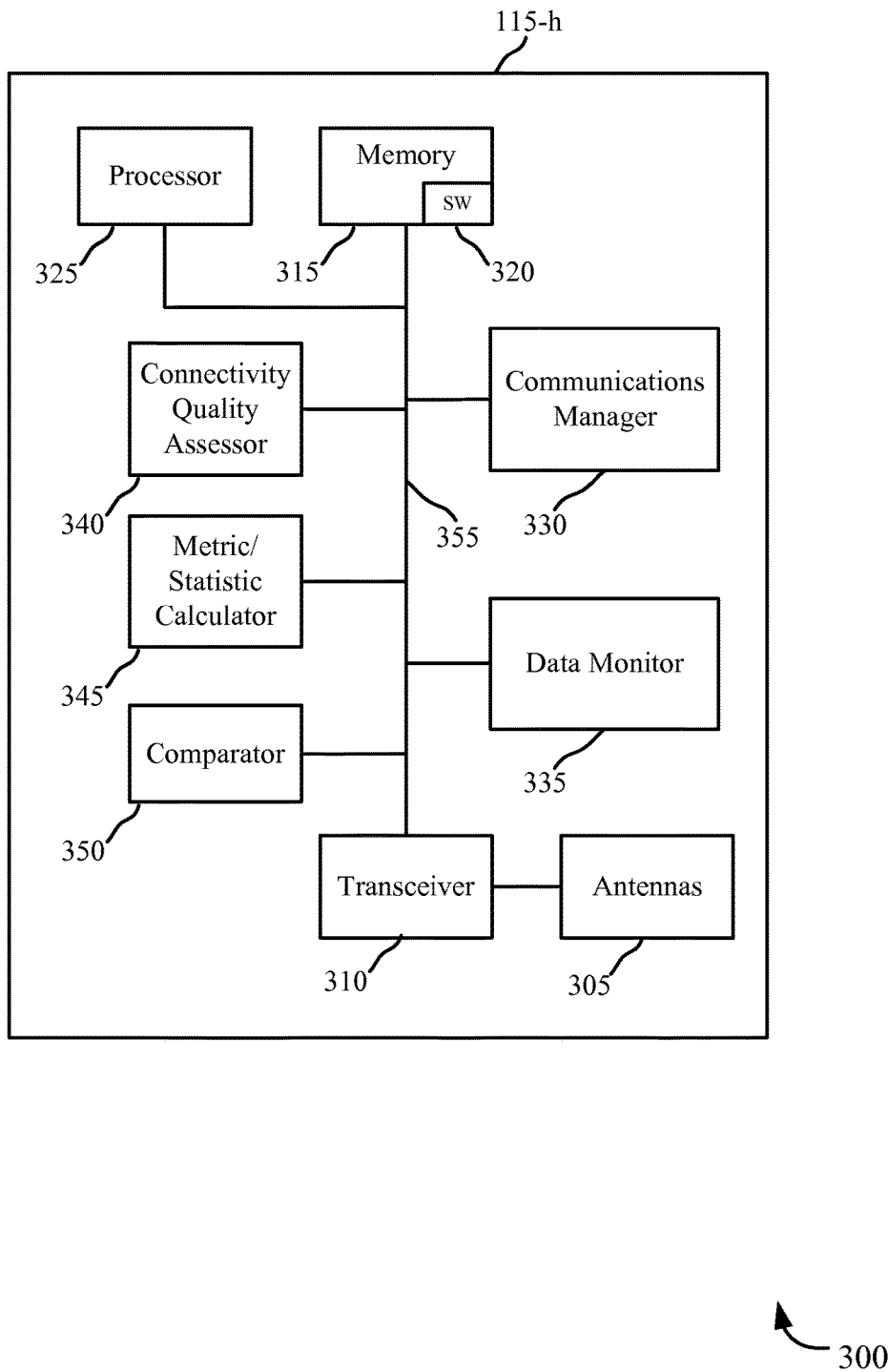
FIG. 3 shows a block diagram of a configuration for implementing a user equipment.

FIG. 3 shows a block diagram 300 of a configuration for implementing a UE 115-h. The UE 115-h may be an example of one or more aspects of a UE 115 described with reference to FIGS. 1, 2A, 2B, 2C, 2D, 2E and/or 2F. The UE 115-h may include one or more antennas 305 configured to receive and transmit wireless signals in cooperation with one or more transceiver(s) 310. The UE 115-h may further include a communications manager 330, a data monitor 335, a connectivity quality assessor 340, a metric/statistic calculator 345, a comparator 350, a processor 325, and a memory 315, each of which may be in communication, directly or indirectly, with each other (e.g., over one or more buses 355).

The transceiver(s) 310 may be configured to communicate, via the antenna(s) 305, with other UEs and/or base stations of one or more networks under control by the communications manager 330. Thus, the transceiver(s) may be means for sending, transmitting, receiving and/or obtaining, alone or in combination with the various other modules of the UE 115-h and/or the antenna(s) 305. The transceiver(s) 310 may include a modem configured to modulate the packets and provide the modulated packets to the antenna(s) 305 for transmission, and to demodulate packets received from the antenna(s) 305.

The memory 315 may include random access memory (RAM) and read-only memory (ROM). The memory 315 may also store computer-readable, computer-executable software code 320 containing instructions that are configured to, when executed, cause the processor 325 to perform various functions described herein (e.g., monitoring, determining, assessing, computing, calculating, identifying, comparing, etc.). Alternatively, the software code 320 may not be directly executable by the processor 325, but may be configured to cause a computer, e.g., when compiled and executed, to perform functions described herein. Thus, the processor 325 may be means for monitoring, determining, assessing, computing, calculating, identifying, comparing, etc., alone or in combination with the memory 315 and the software code 320 and one or more of the other components of the UE 115-h. The processor 325 may include an intelligent hardware device, e.g., a central processing unit (CPU), a microcontroller, an application-specific integrated circuit (ASIC), etc.

The metric/statistic calculator 345 may be configured to perform various calculations, computations and/or determinations of metrics and/or statistics as described herein. The metric/statistic calculator 345 may receive or obtain relevant information from the data monitor 335 and/or the memory 315 for such operations, and may perform such operations in conjunction with the processor 325 and/or the memory 315. Further, the metric/statistic calculator 345 may operate under the control of the communications manager 330 and/or the processor 325.

The comparator 350 may be configured to perform various comparisons of metrics, statistics and/or other values with various thresholds as described herein. The comparator 350 may receive or obtain the metrics/statistics/values from the metric/statistic calculator 345 and/or the memory 315 for such operations, and may perform such operations in conjunction with the processor 325 and/or the memory 315. Further, the comparator 350 may operate under the control of the communications manager 330 and/or the processor 325.

The connectivity quality assessor 340 may be configured to perform various assessments and/or determinations regarding end-to-end connectivity quality as described herein. The connectivity quality assessor 340 may receive or obtain results from the comparator 350 and/or the memory 315 for such operations, and may perform such operations in conjunction with the processor 325 and/or the memory 315. Further, the connectivity quality assessor 340 may operate under the control of the communications manager 330 and/or the processor 325.

The communications manager 330, the data monitor 335, the metric/statistic calculator 345, the comparator 350 and the connectivity quality assessor 340 may be examples of corresponding components described above in FIGS. 2A, 2B, 2C, 2D, 2E and/or 2F, and may implement the functionality for these components. Although the communications manager 330 is shown separately, the functionality of the communications manager 330 may be implemented as a component of the transceiver(s) 310, as a computer program product, and/or as one or more controller elements of the processor 325. Similarly, various other components of the UE 115-h may be implemented as components of the transceiver(s) 310, as a computer program product, and/or as one or more controller elements of the processor 325.

The components of the UE 115-h may, individually or collectively, be implemented with one or more application-specific integrated circuits (ASICs) adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, Field Pro-grammable Gate Arrays (FPGAs), and other Semi-Custom ICs), which may be programmed in any manner known in the art. The functions of each unit may also be implemented, in whole or in part, with instructions embodied in a memory, formatted to be executed by one or more general or application-specific processors. Each of the noted modules/components may be a means for performing one or more functions related to operation of the UE 115-h.

Figure 4:
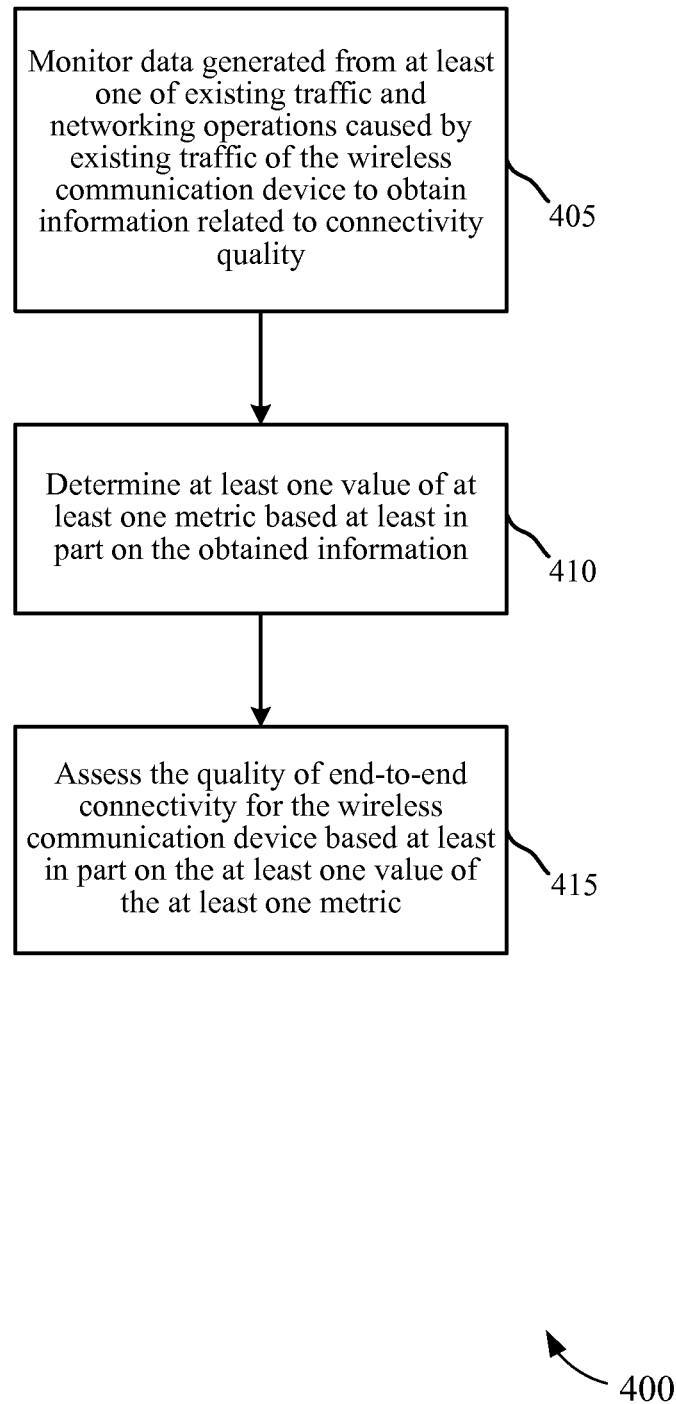
FIG. 4 is a flowchart of a method for assessing the quality of end-to-end connectivity.

FIG. 4 is a flowchart of a method 400 for assessing the quality of end-to-end connectivity for a wireless communications device. For clarity, the method 400 is described below with reference to aspects of one or more of the UEs 115 described with reference to FIGS. 1, 2A, 2B, 2C, 2D, 2E, 2F and/or 3. In one implementation, a UE 115 or a processor thereof may execute one or more sets of codes to control the functional elements of the UE 115 to perform the functions described below.

At block 405, the UE 115 may monitor data generated from at least one of existing traffic and networking operations caused by existing traffic to obtain information related to connectivity quality. As described herein, this may be part of an ongoing process for the UE 115. Next, the UE 115 may determining at least one value of at least one metric using the obtained information at block 410. As described herein, this may involve various calculations or computations as appropriate for or corresponding to the obtained information.

Then, at block 415, the UE 115 may assess the quality of end-to-end connectivity based at least in part on the determined value(s) of the metric(s). As described herein, the assessment may be made using a result or results from one or more comparisons, such as of the metric(s) to one or more corresponding thresholds.

Figure 5:
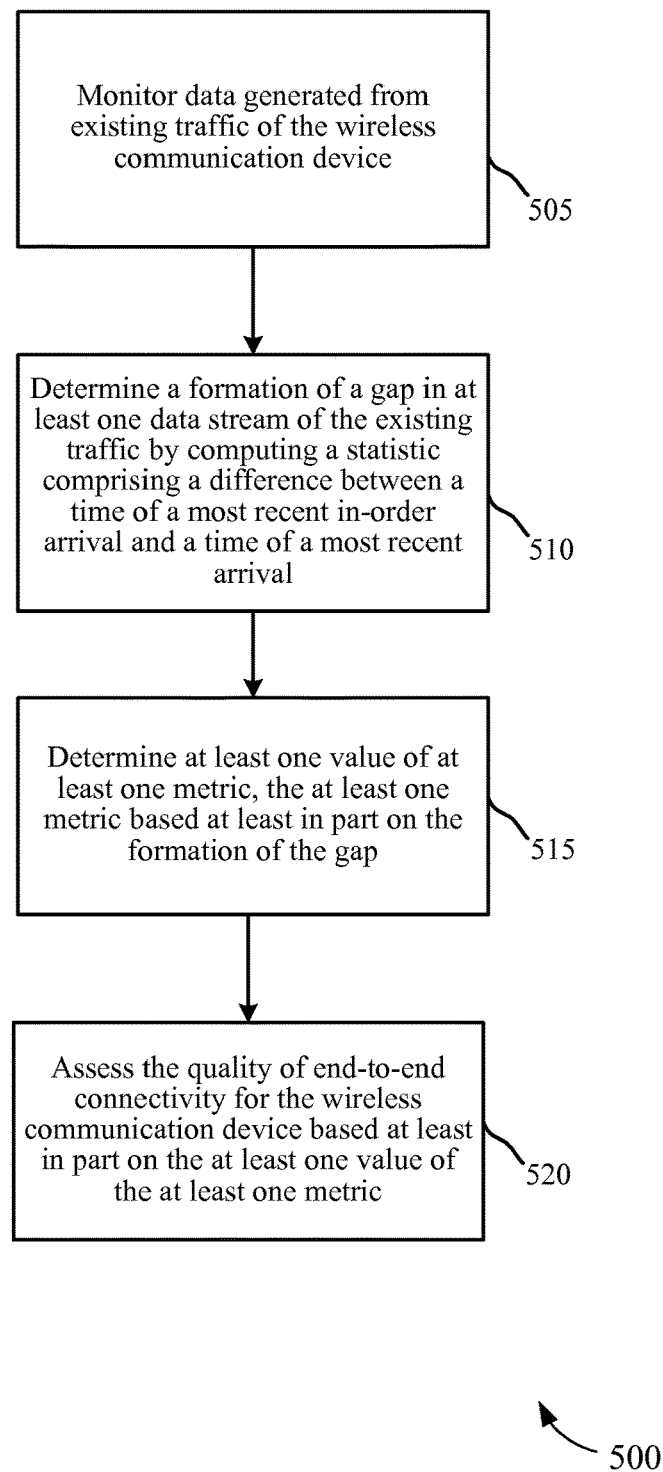
FIG. 5 is a flowchart of another method for assessing the quality of end-to-end connectivity.

FIG. 5 is a flowchart of another method 500 for assessing the quality of end-to-end connectivity for a wireless communications device. For clarity, the method 500 is described below with reference to aspects of one or more of the UEs 115 described with reference to FIGS. 1, 2A, 2B, 2C, 2D, 2E, 2F and/or 3. In one implementation, a UE 115 or a processor thereof may execute one or more sets of codes to control the functional elements of the UE 115 to perform the functions described below.

At block 505, the UE 115 may monitor data generated from existing traffic of the wireless communication device. Next, at block 510, the UE 115 may determine a formation of a gap in at least one data stream of the existing traffic by computing a statistic comprising a difference between a time of a most recent in-order arrival and a time of a most recent arrival. Next, at block 515, the UE 115 may determine at least one value of at least one metric, the at least one metric based at least in part on the formation of the gap. Then, at block 520, the UE 115 may assess the quality of end-to-end connectivity for the wireless communication device based at least in part on the at least one value of the at least one metric.

Figure 6:
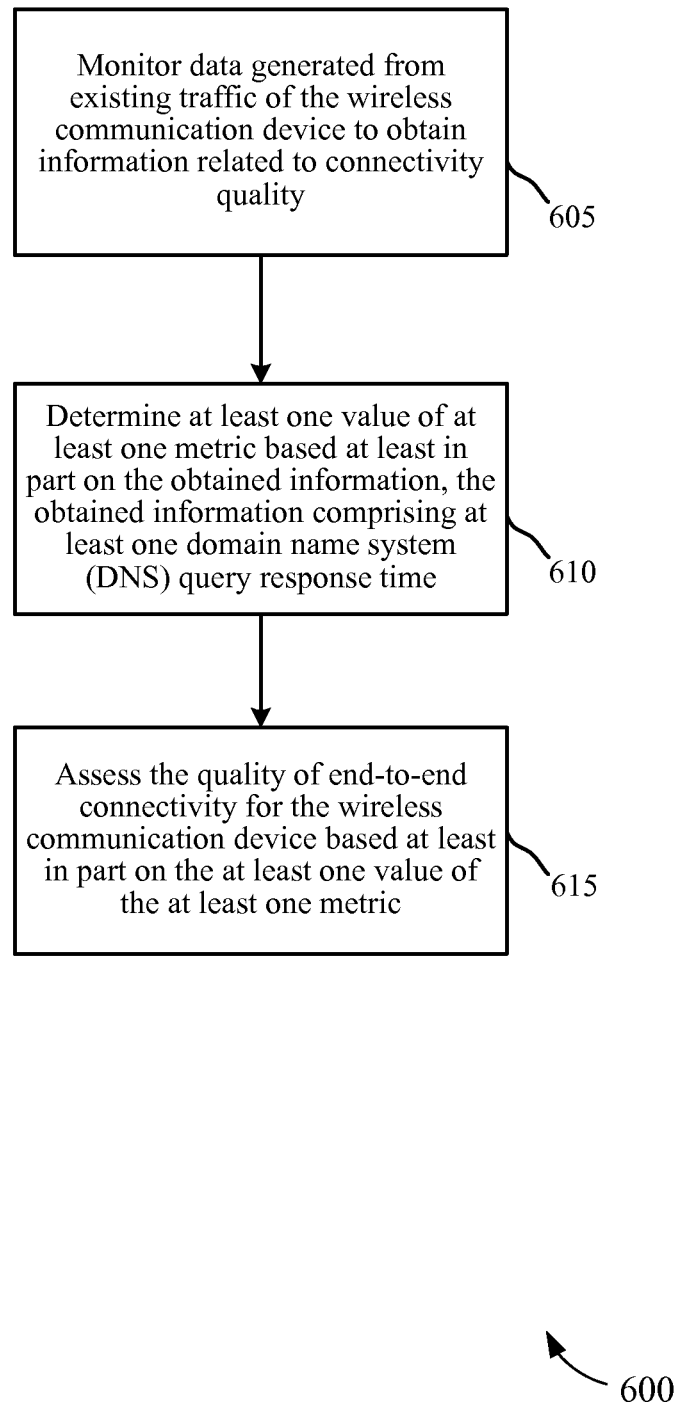
FIG. 6 is a flowchart of yet another method for assessing the quality of end-to-end connectivity.

FIG. 6 is a flowchart of another method 600 for assessing the quality of end-to-end connectivity for a wireless communications device. For clarity, the method 600 is described below with reference to aspects of one or more of the UEs 115 described with reference to FIGS. 1, 2A, 2B, 2C, 2D, 2E, 2F and/or 3. In one implementation, a UE 115 or a processor thereof may execute one or more sets of codes to control the functional elements of the UE 115 to perform the functions described below.

At block 605, the UE 115 may monitor data generated from existing traffic of the wireless communication device to obtain information related to connectivity quality. Next, at block 610, the UE 115 may determine at least one value of at least one metric based at least in part on the obtained information, the obtained information comprising at least one domain name system (DNS) query response time. Then, at block 615, the UE 115 may assess the quality of end-to-end connectivity for the wireless communication device based at least in part on the at least one value of the at least one metric.

Figure 7:
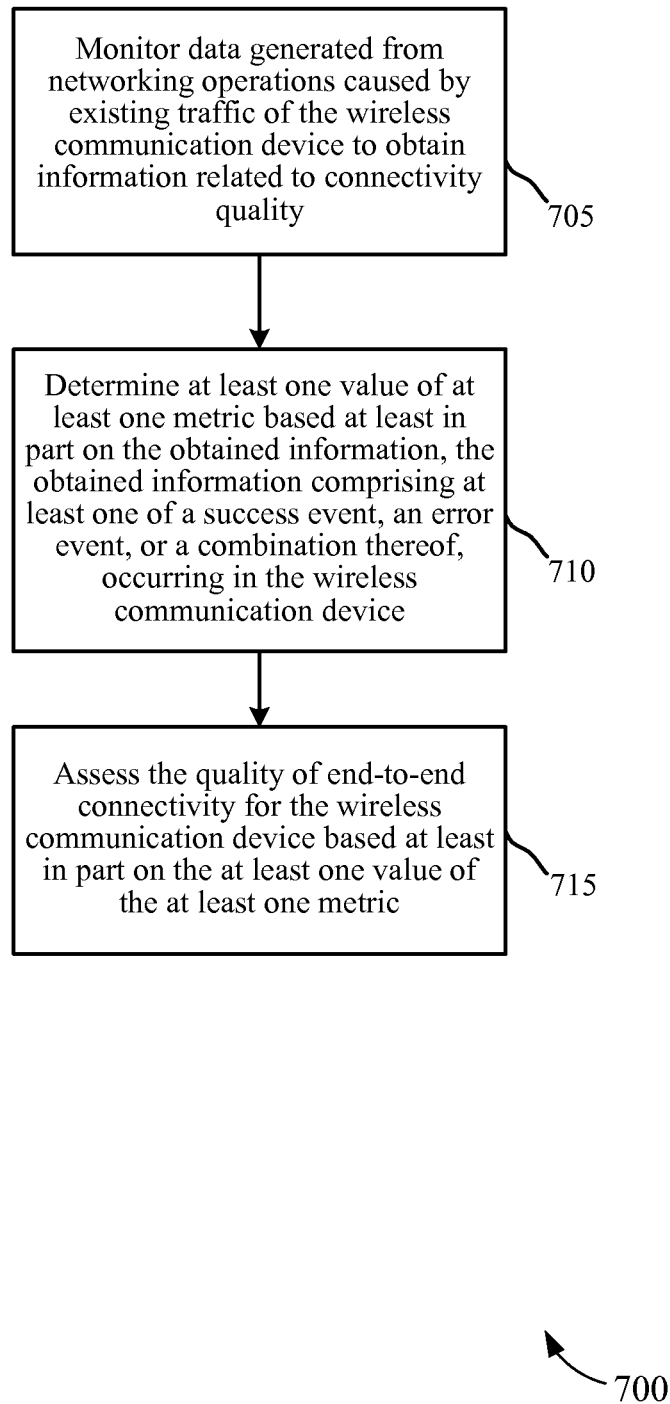
FIG. 7 is a flowchart of still another method for assessing the quality of end-to-end connectivity.

FIG. 7 is a flowchart of another method 700 for assessing the quality of end-to-end connectivity for a wireless communications device. For clarity, the method 700 is described below with reference to aspects of one or more of the UEs 115 described with reference to FIGS. 1, 2A, 2B, 2C, 2D, 2E, 2F and/or 3. In one implementation, a UE 115 or a processor thereof may execute one or more sets of codes to control the functional elements of the UE 115 to perform the functions described below.

At block 705, the UE 115 may monitor data generated from networking operations caused by existing traffic of the wireless communication device to obtain information related to connectivity quality. Next, at block 710, the UE 115 may determine at least one value of at least one metric based at least in part on the obtained information, the obtained information comprising at least one of a success event, an error event, or a combination thereof, occurring in the wireless communication device. Then, at block 715, the UE 115 may assess the quality of end-to-end connectivity for the wireless communication device based at least in part on the at least one value of the at least one metric.

Figure 8:
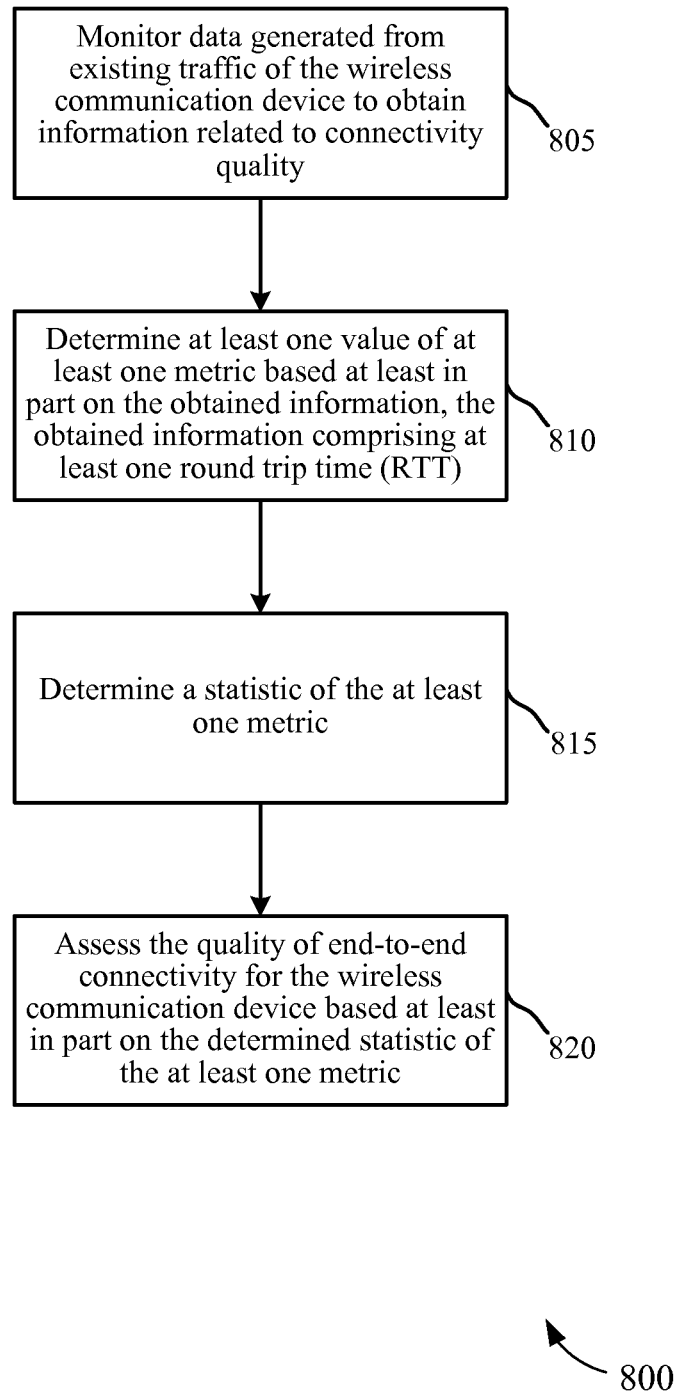
FIG. 8 is a flowchart of a further method for assessing the quality of end-to-end connectivity.

FIG. 8 is a flowchart of another method 800 for assessing the quality of end-to-end connectivity for a wireless communications device. For clarity, the method 800 is described below with reference to aspects of one or more of the UEs 115 described with reference to FIGS. 1, 2A, 2B, 2C, 2D, 2E, 2F and/or 3. In one implementation, a UE 115 or a processor thereof may execute one or more sets of codes to control the functional elements of the UE 115 to perform the functions described below.

At block 805, the UE 115 may monitor data generated from existing traffic of the wireless communication device to obtain information related to connectivity quality. Next, at block 810, the UE 115 may determine at least one value of at least one metric based at least in part on the obtained information, the obtained information comprising at least one round trip time (RTT). Then, at block 815, the UE 115 may determine a statistic of the at least one metric. Then, at block 820, the UE 115 may assess the quality of end-to-end connectivity for the wireless communication device based at least in part on the determined statistic of the at least one metric.

Figure 9:
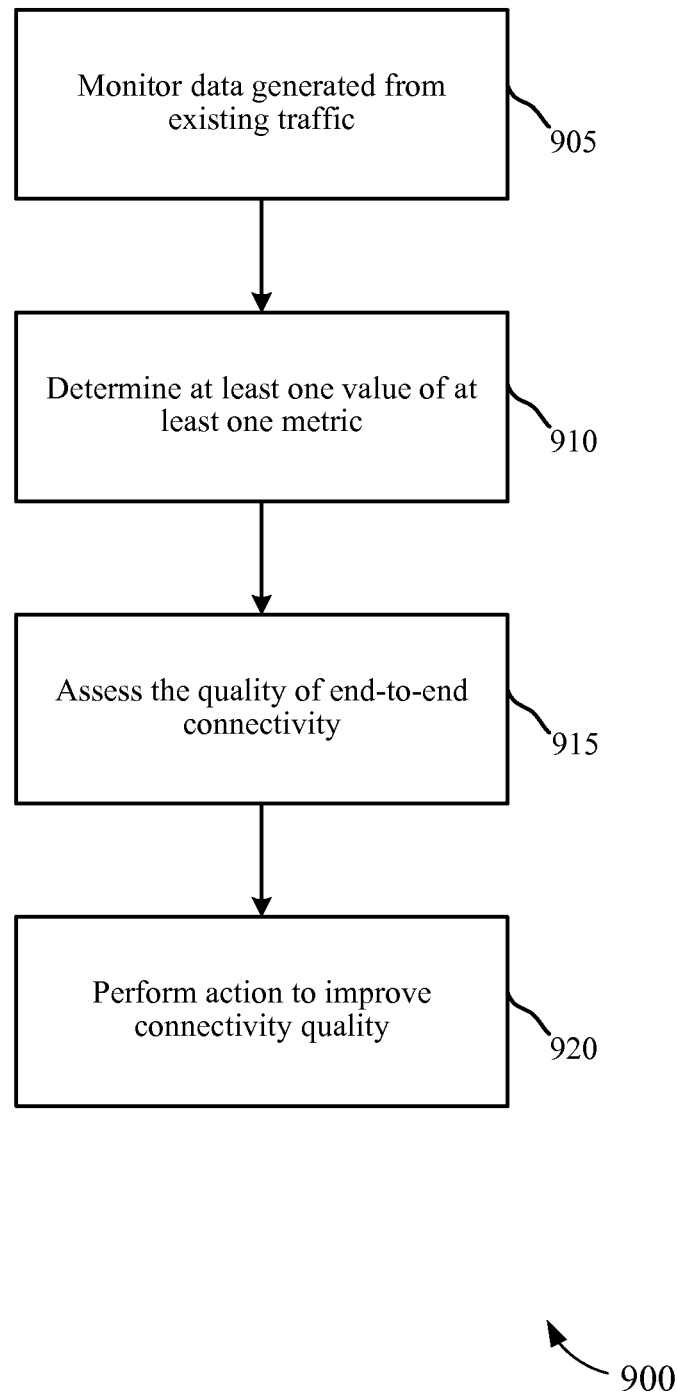
FIG. 9 is a flowchart of another method for assessing the quality of end-to-end connectivity.

FIG. 9 is a flowchart of another method 900 for assessing the quality of end-to-end connectivity for a wireless communications device. For clarity, the method 900 is described below with reference to aspects of one or more of the UEs 115 described with reference to FIGS. 1, 2A, 2B, 2C, 2D, 2E, 2F and/or 3. In one implementation, a UE 115 or a processor thereof may execute one or more sets of codes to control the functional elements of the UE 115 to perform the functions described below.

At block 905, the UE 115 may monitor data generated from existing traffic and/or from networking operations caused by existing traffic to obtain information related to connectivity quality. Next, the UE 115 may determine at least one value of at least one metric using the obtained information at block 910. Then, at block 915, the UE 115 may assess the quality of end-to-end connectivity using the determined value(s) of the metric(s). Each of these operations may be performed as described above with respect to the corresponding operations of the method 400 or as additionally described herein.

At block 920, the UE 115 may perform an action to improve connectivity quality based at least in part on a result of the assessment of the end-to-end connectivity quality. By determining the quality of the end-to-end connectivity, user experience on a given network, interface or connection may be predicted. This may be applied for a variety of purposes such as selecting a best network/interface/connection for exchanging traffic in order to improve the user experience. For example, the presence of a large number of traffic flows may cause congestion in the backhaul and may result in low throughput even if the air-link is of good quality. A user accessing the Wi-Fi network in a public hotspot at a very busy hour may experience this issue. The presence of such issues may be identified or otherwise recognized by the assessed end-to-end connectivity quality. Thus, in one example, the action to improve connectivity quality may be for the UE 115 to switch or suggest to the user to switch to a different WiFi network, LTE, 3G, etc. The action to improve connectivity quality may include disconnecting from the current network and blacklisting it for a certain interval of time in order to allow the switching to a different network connection. The blacklisting forbids and/or prevents the wireless device from reconnecting to the network for a duration of time, such as until the blacklist expires.

Other possible actions to perform may include stopping routing (e.g., sending/receiving) traffic using the network that has been assessed as having poor or bad connectivity quality; blacklisting and start searching for alternative connections, either directly or via a another connection manager module, for example; and, reporting to a network controller about the assessment.

Figure 10:
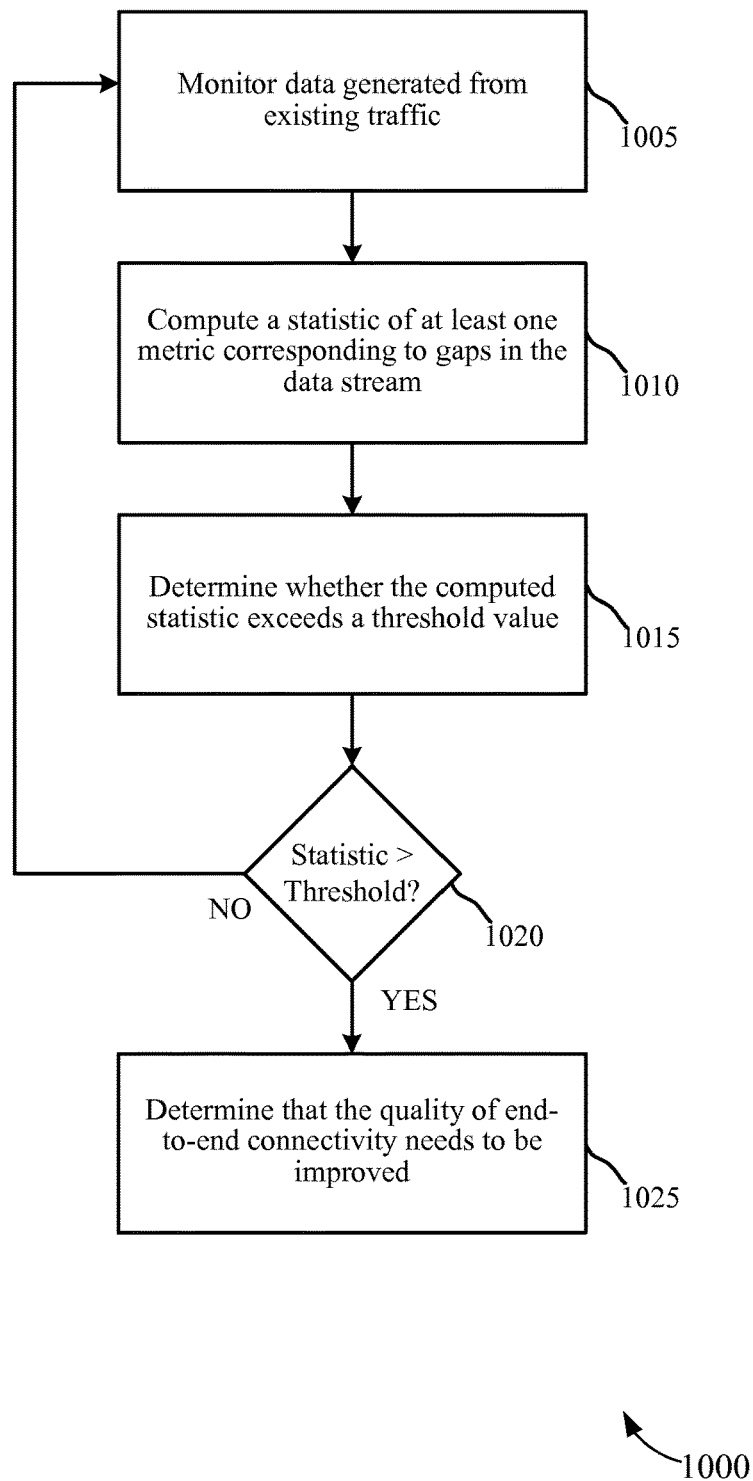
FIG. 10 is a flowchart of yet another method for assessing the quality of end-to-end connectivity.

FIG. 10 is a flowchart of another method 1000 for assessing the quality of end-to-end connectivity for a wireless communications device. For clarity, the method 1000 is described below with reference to aspects of one or more of the UEs 115 described with reference to FIGS. 1, 2A, 2B, 2C, 2D, 2E, 2F and/or 3. In one implementation, a UE 115 or a processor thereof may execute one or more sets of codes to control the functional elements of the UE 115 to perform the functions described below.

At block 1005, the UE 115 may monitor data generated from existing traffic to obtain information related to connectivity quality. Next, the UE 115 may compute or otherwise determine a statistic of at least one metric corresponding to gaps in the data stream at block 1010. An alternative for the operation at block 1010 is to compute or otherwise determine a statistic of at least one metric corresponding to DNS query response times as described herein.

The UE 115 may then determine whether the computed statistic exceeds a threshold value at block 1015. Thus, at block 1020, if the statistic does not exceed the threshold value, then the method 1000 may return to block 1005. Otherwise, if the statistic does exceed the threshold value, then the method 1000 may continue to block 1025, where the UE 115 may determine that the quality of end-to-end connectivity needs to be improved. Although not shown, in some examples, the UE may notify the user for improving the connectivity quality or may take corrective action on its own. In either case, the UE 115 may wait for acknowledgement and/or corrective action by the user or for corrective action by the UE 115 before returning to block 1005. If the process is not ongoing, the method may end at block 1025.

Figure 11:
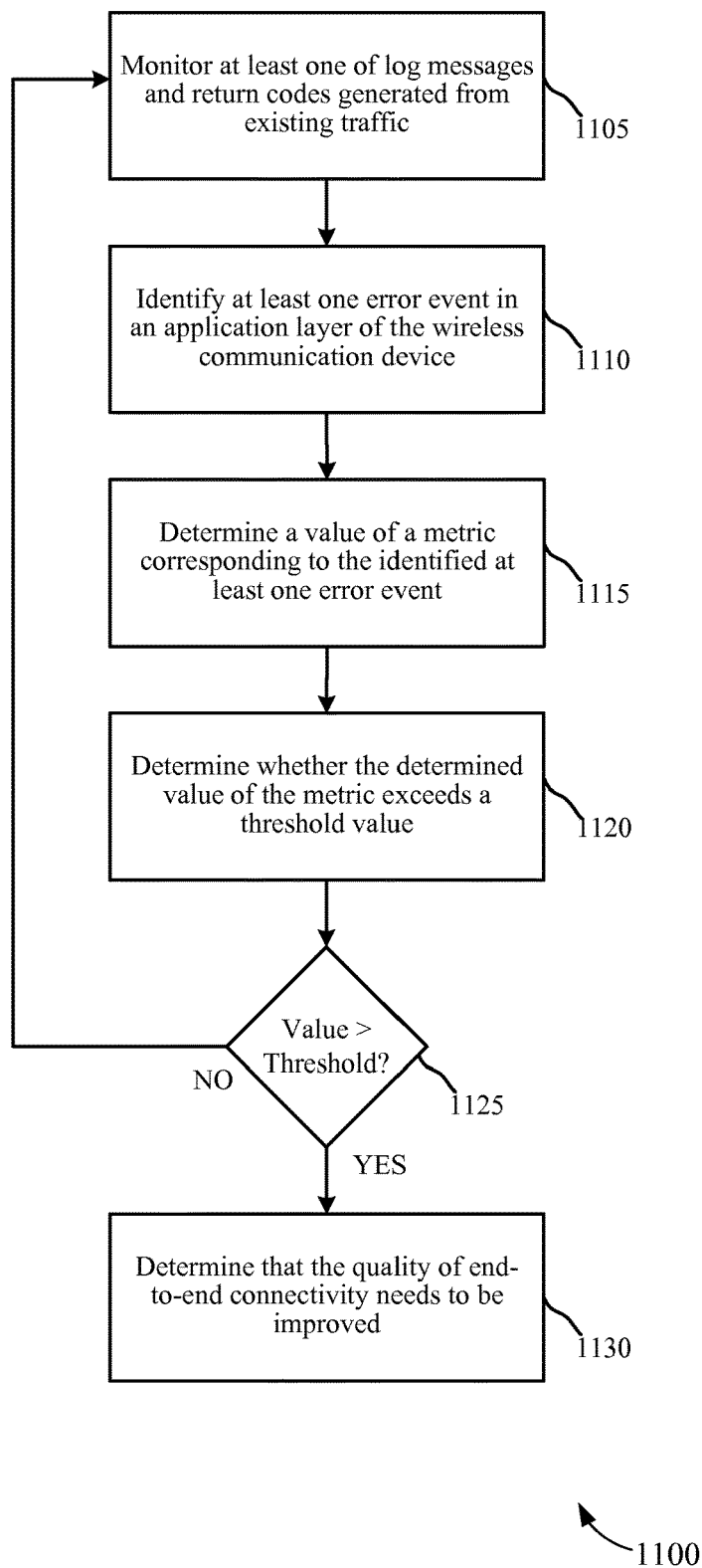
FIG. 11 is a flowchart of still another method for assessing the quality of end-to-end connectivity.

FIG. 11 is a flowchart of another method 1100 for assessing the quality of end-to-end connectivity for a wireless communications device. For clarity, the method 1100 is described below with reference to aspects of one or more of the UEs 115 described with reference to FIGS. 1, 2A, 2B, 2C, 2D, 2E, 2F and/or 3. In one implementation, a UE 115 or a processor thereof may execute one or more sets of codes to control the functional elements of the UE 115 to perform the functions described below.

At block 1105, the UE 115 may monitor data generated from networking operations caused by existing traffic to obtain information related to connectivity quality, namely log messages and/or return codes. Next, the UE 115 may identify at least one error event in an application layer of the wireless communication device at block 1110. Although block 1110 is described with reference to error event(s) in the application layer, the error event(s) may be from other sources as described herein, and may include error events caused by socket operations and/or DNS query operations.

At block 1115, the UE 115 may determine a value of a metric corresponding to the identified at least one error event. The UE 115 may then determine whether the determined value of the metric exceeds a threshold value at block 1120. Thus, at block 1125, if the metric value does not exceed the threshold value, then the method 1100 may return to block 1105. Otherwise, if the metric value does exceed the threshold value, then the method 1100 may continue to block 1130, where the UE 115 may determine that the quality of end-to-end connectivity needs to be improved. Although not shown, in some examples, the UE may notify the user for improving the connectivity quality or may take corrective action on its own. In either case, the UE 115 may wait for acknowledgement and/or corrective action by the user or for corrective action by the UE 115 before returning to block 1105. If the process is not ongoing, the method may end at block 1130.

Figure 12:
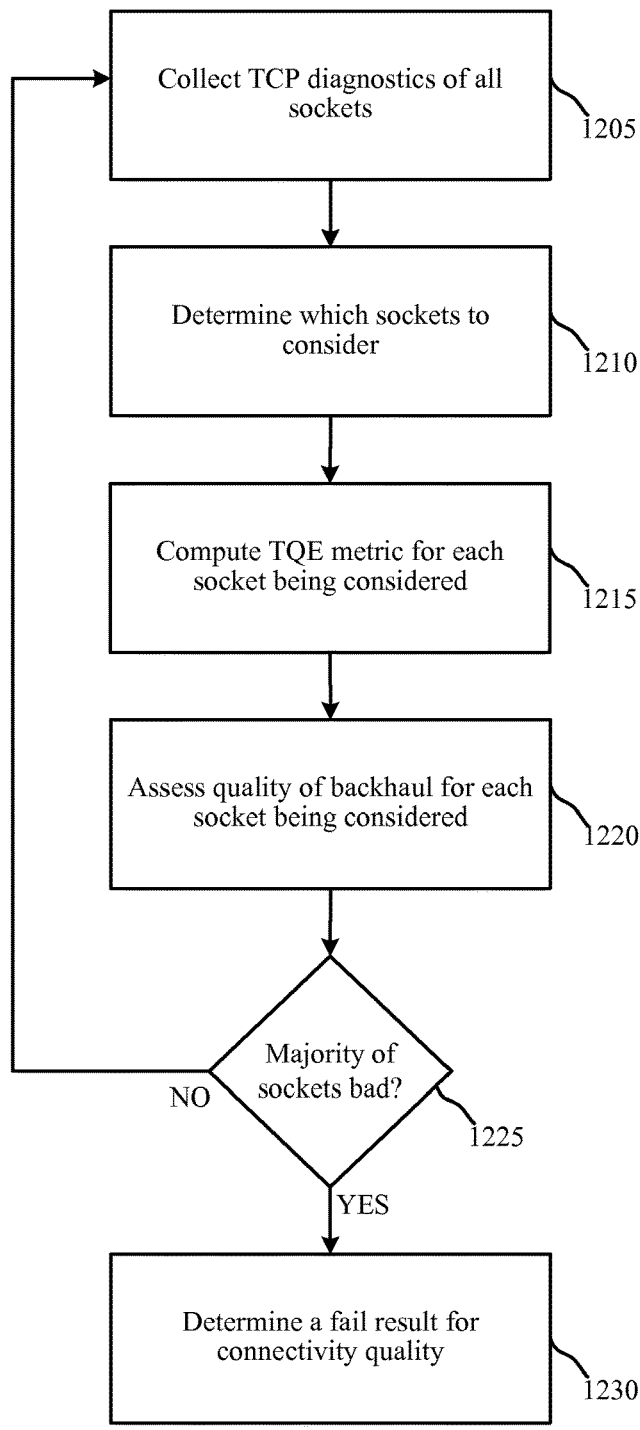
FIG. 12 is a flowchart of a further method for assessing the quality of end-to-end connectivity.

FIG. 12 is a flowchart of another method 1200 for assessing the quality of end-to-end connectivity for a wireless communications device. For clarity, the method 1200 is described below with reference to aspects of one or more of the UEs 115 described with reference to FIGS. 1, 2A, 2B, 2C, 2D, 2E, 2F and/or 3. In one implementation, a UE 115 or a processor thereof may execute one or more sets of codes to control the functional elements of the UE 115 to perform the functions described below. Although the description is with respect to TCP, various examples may involve RTP.

At block 1205, the UE 115 may collect TCP diagnostics of all TCP sockets. As described herein, such diagnostics or statistics may automatically be collected using existing traffic. Next, the UE 115 may determine which TCP sockets to consider or select at block 1210. At block 1215, the UE 115 may compute or otherwise determine a TQE metric for each of the considered/selected sockets using one or more of the TCP diagnostics/statistics. The UE 115 may then assess the quality of the backhaul for each of the considered/selected sockets at block 1220. Such assessment may involve one or more comparisons to one or more thresholds as described herein to determine which sockets are bad. At block 1225, if a majority of the sockets are determined to be bad, the method 1200 may continue to block 1230, where the UE may determine a fail result for connectivity quality, such as a TQE fail described herein. If the majority of the sockets are not bad, then the method may return to block 1205.

Figure 13:
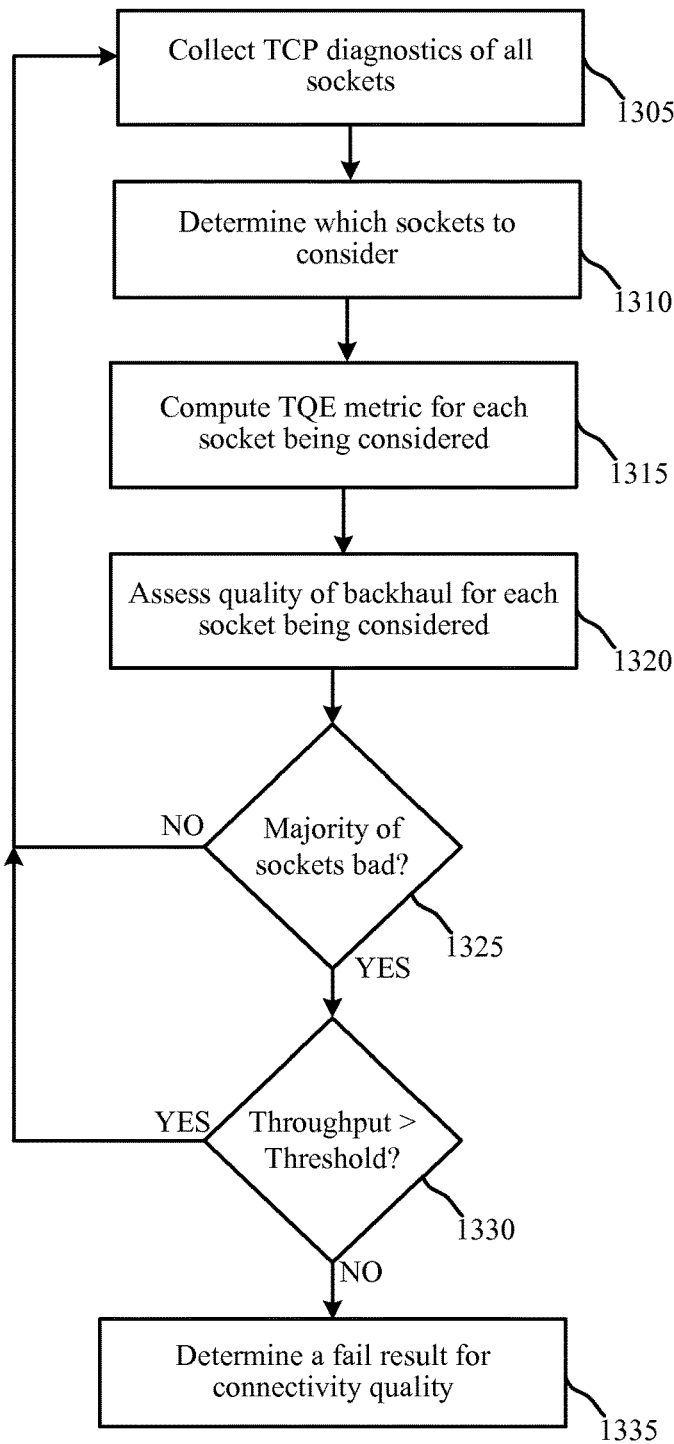
FIG. 13 is a flowchart of another method for assessing the quality of end-to-end connectivity.

FIG. 13 is a flowchart of another method 1300 for assessing the quality of end-to-end connectivity for a wireless communications device. For clarity, the method 1300 is described below with reference to aspects of one or more of the UEs 115 described with reference to FIGS. 1, 2A, 2B, 2C, 2D, 2E, 2F and/or 3. In one implementation, a UE 115 or a processor thereof may execute one or more sets of codes to control the functional elements of the UE 115 to perform the functions described below. Although the description is with respect to TCP, various examples may involve RTP.

At block 1305, the UE 115 may collect TCP diagnostics of all TCP sockets. As described herein, such diagnostics or statistics may automatically be collected using existing traffic. Next, the UE 115 may determine which TCP sockets to consider or select at block 1310. At block 1315, the UE 115 may compute or otherwise determine a TQE metric for each of the considered/selected sockets using one or more of the TCP diagnostics/statistics. The UE 115 may then assess the quality of the backhaul for each of the considered/selected sockets at block 1320. Such assessment may involve one or more comparisons to one or more thresholds as described herein to determine which sockets are bad. At block 1325, if a majority of the sockets are determined to be bad (i.e., the TQE metric is bad), the method 1300 may continue to block 1330, where the UE may compare an interface-level throughput to a threshold. If the interface-level throughput exceeds the threshold, the TQE metric may be considered to be good, and the method 1300 may return to block 1305. Otherwise, the method 1300 may continue to block 1335, where the UE may determine a fail result for connectivity quality, such as a TQE fail described herein.

Techniques described herein may be used for various wireless communications systems such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. The description above, however, describes an LTE system for purposes of example, and LTE terminology is used in much of the description above, although the techniques are applicable beyond LTE applications.

The detailed description set forth above in connection with the appended drawings describes exemplary examples and does not represent the only examples that may be implemented or that are within the scope of the claims. The term "exemplary" used throughout this description means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the spirit or scope of the disclosure. Throughout this disclosure the term "example" or "exemplary" indicates an example or instance and does not imply or require any preference for the noted example. Thus, the disclosure is not to be limited to the examples and designs described herein, but is to be accorded the widest scope consistent with the principles and novel features disclosed herein.

What is claimed is:

1. A method for assessing a quality of end-to-end connectivity for a wireless communication device, comprising:
   selecting, by the wireless communication device, from a plurality of access interfaces one or more access interfaces that are active on the downlink (DL) and inactive on the uplink (UL);
   monitoring, on the selected one or more access interfaces, performance data generated from existing DL traffic of the wireless communication device, the performance data being generated independent of a request received by the wireless communication device for performance data;
   determining a formation of a gap in at least one data stream of the existing DL traffic by computing a statistic comprising a difference between a time of a most recent in-order packet reception and a time of a most recent packet reception of the monitored performance data;
   determining at least one value of at least one metric, the at least one metric based at least in part on the formation of the gap;
   assessing, at the wireless communication device, the quality of end-to-end connectivity for the wireless communication device based at least in part on the at least one value of the at least one metric;
   preventing the wireless communication device from reconnecting to an access point until a pre-determined threshold time value has elapsed, the preventing based at least in part on a result of the assessing; and
   reconnecting to the access point after the pre-determined threshold time value has elapsed.

2. The method of claim 1, wherein the determining the formation of the gap in the at least one data stream further comprises:
   detecting the sending of duplicate acknowledgements (ACKs) in the at least one data stream.

3. The method of claim 1, wherein the assessing the quality of end-to-end connectivity comprises:
   determining whether the computed statistic exceeds a threshold value; and determining that the quality of end-to-end connectivity needs to be improved if the computed statistic exceeds the threshold value.

4. The method of claim 1, wherein the at least one data stream belongs to a transmission control protocol (TCP) connection.

5. The method of claim 1, wherein the at least one data stream belongs to a real-time transport protocol (RTP) connection.

6. The method of claim 1, further comprising:
performing an action to improve connectivity quality for the wireless communication device based at least in part on a result of the assessing.

7. The method of claim 6, wherein performing the action comprises:
switching to one of a different access interface and a different access point on a same interface.

8. The method of claim 1, wherein the monitoring comprises:
monitoring data generated from existing traffic between the wireless communication device and the Internet.

9. The method of claim 1, further comprising:
determining a transport quality estimate (TQE) value using the at least one value of the at least one metric, the assessing of the quality of end-to-end connectivity for the wireless communication device being based at least in part on the TQE value.

10. The method of claim 9, wherein the assessing comprises determining the transport quality estimate (TQE) value to be one of good and fail.

11. The method of claim 10, further comprising:
identifying that interface-level throughput exceeds a threshold, wherein the TQE value is constrained to be good based at least in part on the identifying.

12. The method of claim 1, further comprising:
configuring at least one operational parameter for at least one of the monitoring data, the determining the at least one value, and the assessing the quality, the at least one operational parameter based at least in part on at least one of the active interfaces being used for the existing traffic, an alternative interface available for use, or a combination thereof.

13. The method of claim 1, wherein the quality of end-to-end connectivity comprises at least one of a quality of airlink connectivity, a quality of backhaul connectivity, or a combination thereof.

14. The method of claim 1, further comprising:
prior to preventing the wireless communication device from reconnecting to the access point, disconnecting from the access point.

15. A device to assess a quality of end-to-end connectivity for a wireless communication device, comprising:
a processor;
a memory in electronic communication with the processor; and
instructions stored in the memory, the instructions being executable by the processor to:
select from of a plurality of access interfaces one or more access interfaces that are active on the downlink (DL) and inactive on the uplink (UL);
monitor, on the selected one or more access interfaces, performance data generated from existing DL traffic of the wireless communication device, the performance data being generated independent of a request received by the wireless communication device for performance data;
determine a formation of a gap in at least one data stream of the existing DL traffic by computing a statistic comprising a difference between a time of a most recent in-order packet reception and a time of a most recent packet reception of the monitored performance data;
determine at least one value of at least one metric, the at least one metric based at least in part on the formation of the gap;
assess, at the wireless communication device, the quality of end-to-end connectivity for the wireless communication device based at least in part on the at least one value of the at least one metric;
prevent the wireless communication device from reconnecting to an access point until a pre-determined threshold time value has elapsed, the preventing based at least in part on a result of the assessing; and
reconnect to the access point after the pre-determined threshold time value has elapsed.

16. The device of claim 15, wherein the instructions are executable by the processor to determine the formation of the gap in the at least one data stream by:
detecting the sending of duplicate acknowledgements (ACKs) in the at least one data stream.

17. The device of claim 15, wherein the instructions are executable by the processor to assess the quality of end-to-end connectivity by:
determining whether the computed statistic exceeds a threshold value; and
determining that the quality of end-to-end connectivity needs to be improved if the computed statistic exceeds the threshold value.

18. The device of claim 15, wherein the instructions are executable by the processor to:
perform an action to improve connectivity quality for the wireless communication device based at least in part on a result of the assessing.

19. An apparatus for assessing the quality of end-to-end connectivity for a wireless communication device, comprising:
means for selecting from a plurality of access interfaces one or more access interfaces that are active on the downlink (DL) and inactive on the uplink (UL);
means for monitoring, on the selected one or more access interfaces, performance data generated from existing DL traffic of the wireless communication device, the performance data being generated independent of a request received by the wireless communication device for performance data;
means for determining a formation of a gap in at least one data stream of the existing DL traffic by computing a statistic comprising a difference between a time of a most recent in-order packet reception and a time of a most recent packet reception of the monitored performance data;
means for determining at least one value of at least one metric, the at least one metric based at least in part on the formation of the gap;
means for assessing, at the wireless communication device, the quality of end-to-end connectivity for the wireless communication device based at least in part on the at least one value of the at least one metric;
means for preventing the wireless communication device from reconnecting to an access point until a pre-determined threshold time value has elapsed, the preventing based at least in part on a result of the assessing; and means for reconnecting to the access point after the pre-determined threshold time value has elapsed.

20. The apparatus of claim 19, wherein the means for determining the formation of the gap in the at least one data stream further comprises:
means for detecting the sending of duplicate acknowledgements (ACKs) in the at least one data stream.

21. The apparatus of claim 19, wherein the means for assessing the quality of end-to-end connectivity comprises:
means for determining whether the computed statistic exceeds a threshold value; and
means for determining that the quality of end-to-end connectivity needs to be improved if the computed statistic exceeds the threshold value.

22. The apparatus of claim 19, further comprising:
means for performing an action to improve connectivity quality for the wireless communication device based at least in part on a result of the assessing.

23. A non-transitory computer-readable medium storing computer-executable code for wireless communication, the code executable by a processor to:
select from a plurality of access interfaces one or more access interfaces that are active on the downlink (DL) and inactive on the uplink (UL);
monitor, on the selected one or more access interfaces, performance data generated from existing DL traffic of a wireless communication device, the performance data being generated independent of a request received by the wireless communication device for performance data;
determine a formation of a gap in at least one data stream of the existing DL traffic by computing a statistic comprising a difference between a time of a most recent in-order packet reception and a time of a most recent packet reception of the monitored performance data;
determine at least one value of at least one metric, the at least one metric based at least in part on the formation of the gap;
assess, at the wireless communication device, the quality of end-to-end connectivity for the wireless communication device based at least in part on the at least one value of the at least one metric;
prevent the wireless communication device from reconnecting to an access point until a pre-determined threshold time value has elapsed, the preventing based at least in part on a result of the assessing; and
reconnect to the access point after the pre-determined threshold time value has elapsed.

24. The non-transitory computer-readable medium of claim 23, wherein the code is executable by the processor to determine the formation of the gap in the at least one data stream by:
detecting the sending of duplicate acknowledgements (ACKs) in the at least one data stream.

25. The non-transitory computer-readable medium of claim 23, wherein the code is executable by the processor to assess the quality of end-to-end connectivity by:
determining whether the computed statistic exceeds a threshold value; and
determining that the quality of end-to-end connectivity needs to be improved if the computed statistic exceeds the threshold value.

26. The non-transitory computer-readable medium of claim 23, wherein the code is executable by the processor to:
perform an action to improve connectivity quality for the wireless communication device based at least in part on a result of the assessing.

* * * * *